US009625753B2

(12) United States Patent
Kim et al.

(10) Patent No.: US 9,625,753 B2
(45) Date of Patent: Apr. 18, 2017

(54) LIQUID CRYSTAL DISPLAY AND METHOD OF MANUFACTURING THE SAME

(71) Applicant: Samsung Display Co., Ltd., Yongin, Gyeonggi-Do (KR)

(72) Inventors: Yeun Tae Kim, Hwaseong-si (KR); Koichi Sugitani, Hwaseong-si (KR); Jung Wook Lee, Uiwang-si (KR); Hoon Kang, Suwon-si (KR); Min Su Kim, Seoul (KR); Seon-Il Kim, Seoul (KR); Hee-Keun Lee, Suwon-si (KR)

(73) Assignee: Samsung Display Co., Ltd. (KR)

( * ) Notice: Subject to any disclaimer, the term of this patent is extended or adjusted under 35 U.S.C. 154(b) by 85 days.

(21) Appl. No.: 14/147,150

(22) Filed: Jan. 3, 2014

(65) Prior Publication Data

US 2015/0049282 A1  Feb. 19, 2015

(30) Foreign Application Priority Data

Aug. 13, 2013  (KR) .................. 10-2013-0096045

(51) Int. Cl.
| *G02F 1/1333* | (2006.01) |
| *G02F 1/1335* | (2006.01) |
| *G02F 1/1362* | (2006.01) |
| *G02F 1/1341* | (2006.01) |

(52) U.S. Cl.
CPC .. *G02F 1/133377* (2013.01); *G02F 1/133512* (2013.01); *G02F 1/1341* (2013.01); *G02F 1/136227* (2013.01)

(58) Field of Classification Search
CPC ............. G02F 1/133377; G02F 1/1341; G02F 1/136227; G02F 1/133512

USPC .................................................. 349/155, 156
See application file for complete search history.

(56) References Cited

U.S. PATENT DOCUMENTS

| 5,978,062 | A | * | 11/1999 | Liang et al. ................... 349/155 |
| 6,141,072 | A | * | 10/2000 | Drabik et al. ................ 349/122 |
| 6,198,217 | B1 | | 3/2001 | Suzuki et al. |
| 6,469,761 | B1 | | 10/2002 | Drabik et al. |
| 2010/0014011 | A1 | | 1/2010 | Mottram et al. |
| 2010/0051951 | A1 | * | 3/2010 | Lee et al. .......................... 257/59 |
| 2010/0328591 | A1 | * | 12/2010 | Oh et al. ......................... 349/114 |
| 2011/0032457 | A1 | * | 2/2011 | Kwak .................... G02B 5/201 349/106 |
| 2011/0181816 | A1 | * | 7/2011 | Kang et al. .................... 349/106 |

(Continued)

FOREIGN PATENT DOCUMENTS

| JP | 2008-033117 | 2/2008 |
| JP | 2008-242031 | 10/2008 |

(Continued)

*Primary Examiner* — Sang V Nguyen
(74) *Attorney, Agent, or Firm* — Innovation Counsel LLP

(57) ABSTRACT

A liquid crystal display device includes: a substrate; a thin film transistor disposed on the substrate; a pixel electrode connected with the thin film transistor; and a roof layer disposed to face the pixel electrode, wherein a plurality of microcavities having respective liquid crystal injection holes are formed between the pixel electrode and the roof layer, and the microcavities are filled with electrically orientatable liquid crystal molecules, wherein a light blocking layer disposed adjacent to the injection holes is formed and covering the thin film transistor, wherein the light blocking layer is covered by a passivation layer.

12 Claims, 34 Drawing Sheets

(56) References Cited

U.S. PATENT DOCUMENTS

| | | | | |
|---|---|---|---|---|
| 2011/0242468 | A1* | 10/2011 | Choi et al. | 349/129 |
| 2012/0062448 | A1* | 3/2012 | Kim | G02F 1/133377 |
| | | | | 345/55 |
| 2012/0229724 | A1* | 9/2012 | Miyairi | C09K 19/0275 |
| | | | | 349/43 |
| 2012/0281172 | A1* | 11/2012 | Park | G02F 1/133707 |
| | | | | 349/123 |
| 2014/0002764 | A1* | 1/2014 | Seo | G02F 1/1343 |
| | | | | 349/43 |
| 2014/0204316 | A1* | 7/2014 | Kim | G02F 1/133377 |
| | | | | 349/84 |
| 2014/0293193 | A1* | 10/2014 | Lim | G02F 1/1341 |
| | | | | 349/86 |
| 2014/0322845 | A1* | 10/2014 | Lee | H01L 27/1259 |
| | | | | 438/30 |
| 2014/0347611 | A1* | 11/2014 | Kim | G02F 1/133514 |
| | | | | 349/106 |
| 2014/0354921 | A1* | 12/2014 | Lee | G02F 1/1341 |
| | | | | 349/89 |

FOREIGN PATENT DOCUMENTS

| | | | | |
|---|---|---|---|---|
| KR | 10-2002-0047748 A | | 6/2002 | |
| KR | 10-2008-0049193 A | | 6/2008 | |
| KR | 10-2012-0026880 A | | 3/2012 | |
| KR | 2014-0003848 | * | 1/2014 | G02F 1/1368 |
| KR | 2014-0003848 | * | 10/2014 | G02F 1/1368 |

\* cited by examiner

LIQUID CRYSTAL DISPLAY AND METHOD OF MANUFACTURING THE SAME

CROSS-REFERENCE TO RELATED APPLICATION

This application claims priority to and the benefit of Korean Patent Application No. 10-2013-0096045 filed in the Korean Intellectual Property Office on Aug. 13, 2013, the entire contents of which application are incorporated herein by reference.

BACKGROUND (a) Field

The present disclosure of invention relates to a liquid crystal display device, and a method of manufacturing the same.

(b) Description of Related Technology

A liquid crystal display (LCD), which is one type among flat or otherwise thin panel displays is the most widely used presently. Typically, it includes two spaced apart display panels that are glued together. Electric field generating electrodes are typically respectively provided on the spaced apart panels, for example pixel electrodes on a bottom one and an opposed common electrode on the top one with a liquid crystal layer (LCL) interposed therebetween.

The liquid crystal display device displays a desired image by controlled generation of electric fields through the liquid crystal layer (LCL). Control can be had by applying a voltage between the field generating electrodes. This determines rotational orientations of liquid crystal molecules of the liquid crystal layer through the generated field, and determines a degree of polarization applied to passing through incident light.

A technology of forming a cavity in the unit of a pixel, and filling the cavity with liquid crystal to implement a display has been developed as one way of forming the liquid crystal displays. This technology is a technology of manufacturing a display by forming a sacrificial layer with an organic material, forming a supporting member on the sacrificial layer, removing the sacrificial layer, and filling an empty space formed as a result of the removal of the sacrificial layer with liquid crystal through a liquid crystal injection hole. The latter is carried out instead of forming an upper panel on a lower panel and gluing them together.

In the mass production manufacturing process of forming the liquid crystal display device having the cavity, a light blocking member may need to be opened in a same region in which a thin film transistor (TFT) is formed so as to expose the TFT such that, after forming the thin film transistor, a repair of the thin film transistor (FT) may take place. However, the light blocking member or its equivalent may be damaged in a subsequent process, for example where an ashing takes place for forming an empty space by removing a sacrificial layer. If the light blocking member is damaged, the LCD device may fail to operate as desired.

It is to be understood that this background of the technology section is intended to provide useful background for understanding the here disclosed technology and as such, the technology background section may include ideas, concepts or recognitions that were not part of what was known or appreciated by those skilled in the pertinent art prior to corresponding invention dates of subject matter disclosed herein.

SUMMARY

The present disclosure of invention provides a liquid crystal display device including a light blocking member which is protected by a self-aligned passivation pattern and thus not damaged by a removal process that removes a predetermined sacrificial material and thus forms a microcavity for monolithically integrally encapsulating liquid crystals of the display device. A method of manufacturing the same is also provided.

An exemplary liquid crystal display device comprises: a substrate; a thin film transistor disposed on the substrate; a pixel electrode connected with the thin film transistor; and a roof layer disposed to face the pixel electrode, wherein a plurality of microcavities having respective liquid crystal injection holes are defined between the pixel electrode and the roof layer, and the microcavities contain electrically orientatable liquid crystal molecules, wherein a light blocking layer disposed adjacent to the liquid crystal injection holes is formed and covering the thin film transistor, and where the light blocking layer is covered by a passivation layer.

The light blocking layer may be disposed on a portion of the pixel electrode.

The liquid crystal display may further include an interlayer insulating layer disposed between the thin film transistor and the pixel electrode, in which the pixel electrode and the thin film transistor may be connected by a contact hole formed through the interlayer insulating layer.

The light blocking layer may cover the contact hole.

The passivation layer may have a width larger than that of the light blocking layer and may cover the light blocking layer.

The light blocking layer may include a first light blocking layer portion extending in a horizontal row direction of the display device and a second light blocking layer portion extending in a vertical column direction of the display device, and the first light blocking layer portion may overlap a gate line and the second light blocking layer portion may overlap the data line.

The liquid crystal display device may further include a storage electrode line disposed in a direction in which the data line is extended, in which one edge of the storage electrode line may be disposed more adjacently to the pixel electrode compared to one edge of the light blocking layer.

One edge of the gate line may be disposed more adjacently to the pixel electrode compared to one edge of the light blocking layer.

The liquid crystal display may further include a color filter disposed between the thin film transistor and the interlayer insulating layer.

The liquid crystal display may further include an organic layer disposed between the color filter and the interlayer insulating layer.

The passivation layer may include at least one of a silicon nitride and a silicon oxide.

The liquid crystal display may further include a common electrode disposed between the microcavity and the roof layer.

The liquid crystal display may further include a capping layer disposed on the roof layer and covering the liquid crystal injection holes.

Another exemplary embodiment provides a method of manufacturing a liquid crystal display, including: forming a thin film transistor on a substrate; forming an interlayer insulating layer on the thin film transistor; forming a pixel electrode on the interlayer insulating layer; forming a light blocking layer on the pixel electrode and the interlayer insulating layer; forming a first sacrificial layer at a portion disposed around the light blocking layer and corresponding to a pixel region; forming a passivation material layer on the first sacrificial layer and the light blocking layer; forming a photosensitive film on the passivation material layer; forming a photosensitive film pattern by irradiating light to the substrate; forming a passivation layer corresponding to the light blocking layer by patterning the passivation material layer by using the photosensitive film pattern as a mask; removing the photosensitive film pattern and the first sacrificial layer; forming a second sacrificial layer on the pixel electrode; forming a roof layer on the second sacrificial layer; forming a plurality of microcavities in which a liquid crystal injection hole is formed by selectively removing the second sacrificial layer; and injecting a liquid crystal material in the microcavities.

In the forming of the photosensitive film pattern, light may be irradiated in a direction from the bottom of the substrate toward the light blocking layer.

The photosensitive film pattern may be formed by removing the photosensitive film disposed at a portion corresponding to the pixel region.

The photosensitive film may include positive photoresist.

The first sacrificial layer may include a photoresist material.

The thin film transistor may be connected with the pixel electrode through a contact hole formed through the interlayer insulating layer.

The light blocking layer may be formed to cover the thin film transistor and the contact hole.

The light blocking layer may include a first light blocking layer portion extending in a row1 direction of the liquid crystal display and a second light blocking layer portion extending in a column direction, and the first light blocking layer may overlap a gate line and the second light blocking layer may overlap the data line.

The photosensitive film may be formed of a positive photoresist.

In the forming of the photosensitive film pattern, light irradiated through the substrate may be blocked by the light blocking layer, so that the photosensitive film pattern may be formed.

One edge of the light blocking layer may be formed to be far apart from the pixel electrode compared to one edge of the gate line.

The method may further include forming a storage electrode line disposed in a direction in which the data line is extended, in which one edge of the light blocking layer may be formed to be far apart from the pixel electrode compared to one edge of the storage electrode line.

The method may further include forming a color filter between the thin film transistor and the interlayer insulating layer.

The method may further include forming a common electrode between the second sacrificial layer and the roof layer.

The method may further include forming a capping layer so as to cover the liquid crystal injection holes.

The method may further include performing oxygen plasma processing on the microcavities.

In the forming of the passivation layer, the passivation layer may be formed to have a width larger than that of the light blocking layer and cover the light blocking layer.

According to the exemplary embodiments, the light blocking layer formed after the forming of the pixel electrode has a structure surrounded by the passivation layer, so that the light blocking layer is not damaged during a process, such as ashing, for forming the microcavity.

DETAILED DESCRIPTION

Figure 1:
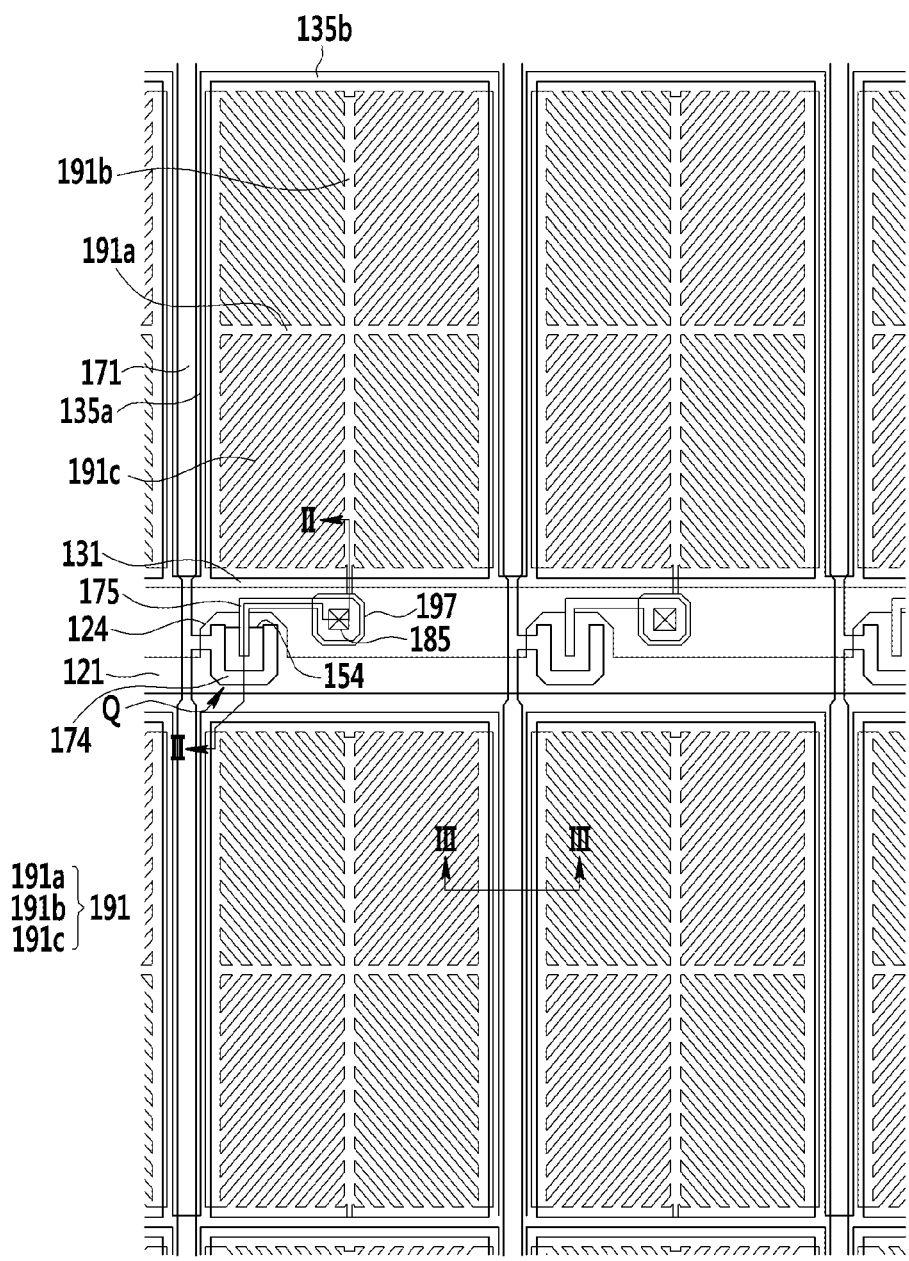
FIG. 1 is a top plan view illustrating a liquid crystal display device according to an exemplary embodiment of the present disclosure of invention.

Exemplary embodiments in accordance with the present disclosure of invention will be described with reference to the accompanying drawings. However, the present disclosure is not limited to the exemplary embodiments used herein and may be implemented in other forms. On the contrary, exemplary embodiments introduced herein are provided to make disclosed contents thorough and complete and sufficient to transfer the spirit of the present teachings to those skilled in the art.

In the drawings, the thickness of layers, films, panels, regions, etc., are exaggerated for clarity. It will be understood that when a layer is referred to as being "on" another layer or substrate, it can be directly on the other layer or substrate, or intervening them may also be present. Like reference numerals designate like elements throughout the specification.

Figure 2:
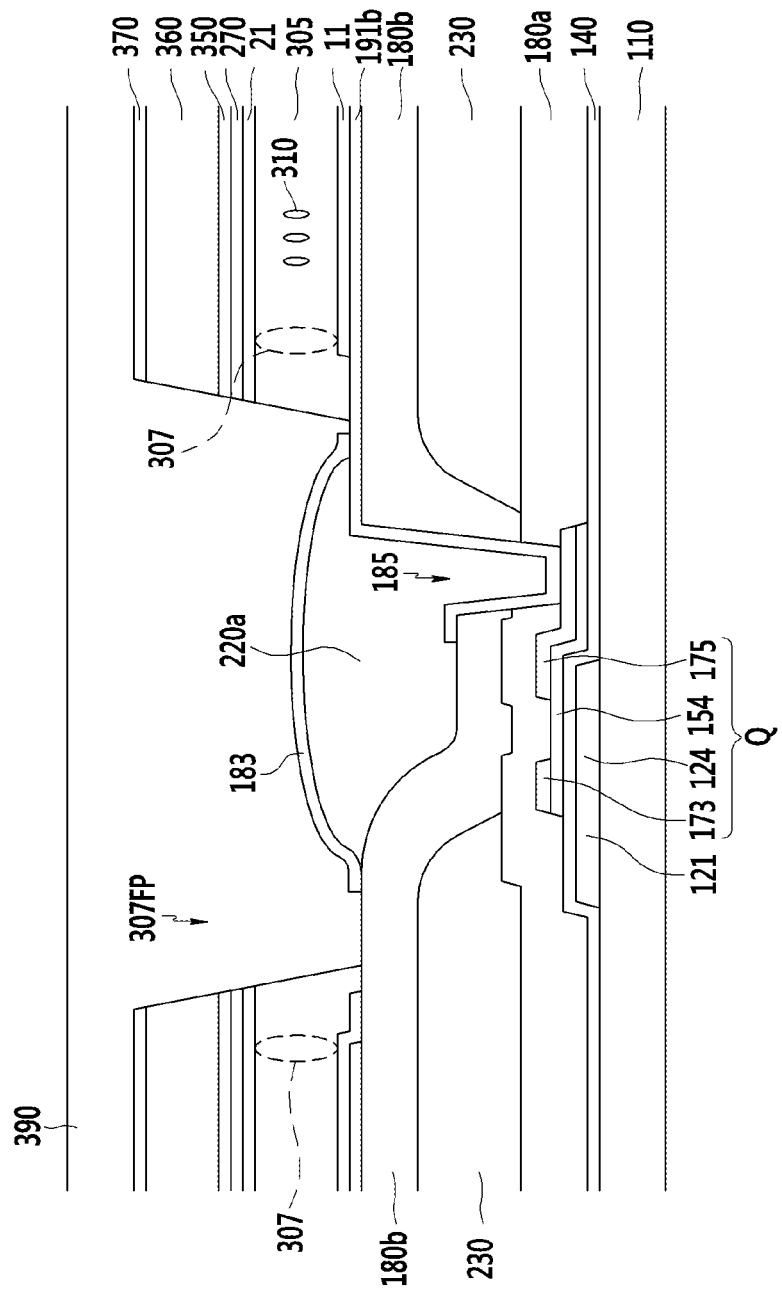
FIG. 2 is a cross-sectional view taken along line II-II of FIG. 1.
Figure 3:
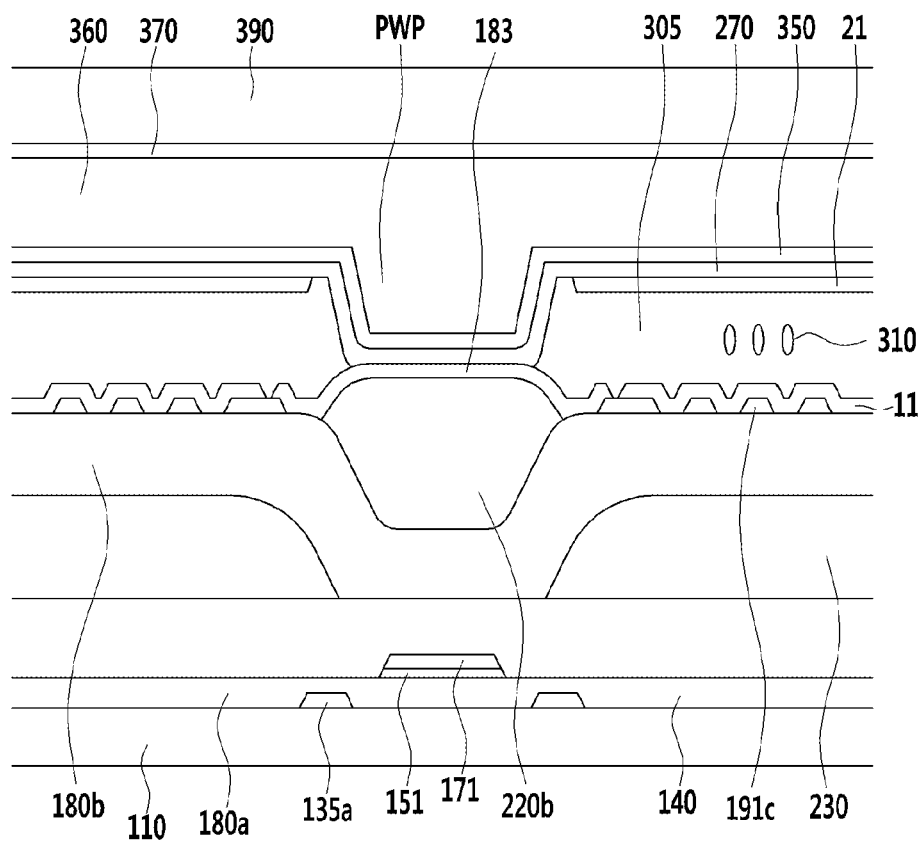
FIG. 3 is a cross-sectional view taken along line of FIG. 1.

FIG. 1 is a top plan view illustrating a liquid crystal display according to an exemplary embodiment of the present invention. FIG. 2 is a cross-sectional view taken along line II-II of FIG. 1. FIG. 3 is a cross-sectional view taken along line of FIG. 1.

Referring to FIGS. 1 to 3, as part of a repeated pattern, a gate line 121 and a storage electrode line 131 are disposed on an insulating substrate 110 formed of a light-passing (e.g., transparent) glass or plastic. The gate line 121 includes a gate electrode 124 integrally branching therefrom. The storage electrode line 131 is mainly extended in a horizontal direction of FIG. 1, and is configured to transfer a predetermined reference voltage, such as a common voltage Vcom for use in biasing a corresponding storage capacitance. The storage electrode line 131 includes a pair of vertical portions (storage stems) 135a substantially extended to be vertical to the gate line 121a, and a horizontal portion (stem shorting bar) 135b connecting ends of the pair of vertical portions 135a to each other. The vertical portion and horizontal portion 135a and 135b of the storage electrode line have a structure surrounding the pixel electrode 191.

A gate insulating layer 140 is formed on the gate line 121 and the storage electrode line 131. A semiconductor layer 151 that is disposed under the data line 171, and a semiconductor layer 154 disposed under a source/drain electrode and also at a channel portion of a thin film transistor Q are formed on the gate insulating layer 140.

A plurality of ohmic contacts may be formed on the respective semiconductor layers 151 and 154, and between the data line 171 and the source/drain electrode, which is omitted in the drawing.

Data conductor wirings 171, 173, and 175; including a data line 171 which is integrally connected with a source electrode 173, and a drain electrode 175 are formed on the respective semiconductor layers 151 and 154, and the gate insulating layer 140.

The gate electrode 124, the source electrode 173, and the drain electrode 175 form the thin film transistor Q together with the semiconductor layer 154, and a channel portion of the thin film transistor Q is formed in the area of the semiconductor layer 154 between the source electrode 173 and the spaced apart drain electrode 175.

A first interlayer insulating layer (dielectric) 180a is formed on the data wiring conductors 171, 173, and 175, and on an exposed portion of the semiconductor layer 154. The first interlayer insulating layer 180a may include an inorganic insulating material, such as a silicon nitride (SiNx) and/or a silicon oxide (SiOx), or an organic insulating material.

A color filter 230 is formed on the first interlayer insulating layer 180a. The color filter 230 may be used as an optical bandpass for displaying a desired one among primary colors, such as red, green, and blue. However, the colors are not limited to these three primary colors, and the color filter 230 may instead or also display one among a cyan-based color, a magenta-based color, a yellow-based color, and a white-based color. The color filter 230 may be formed of a material displaying different colors on each adjacent pixel.

A second interlayer insulating layer 180b covering the color filter 230 is formed on the color filter 230. The second interlayer insulating layer 180b may include an inorganic insulating material (dielectric), such as a silicon nitride (SiNx) and/or a silicon oxide (SiOx), or an organic insulating material. Contrary to the illustration in the cross-sectional view of FIG. 2, in a case where a step is generated between a portion at which the color filer 230 is disposed and a portion at which the thin film transistor Q is disposed, the second interlayer insulating layer 180b may include an organic insulating material configured so as to decrease or remove the step.

A pixel electrode 191 is disposed on the second interlayer insulating layer 180b. The pixel electrode 191 may be formed of a transparent conductive material, such as ITO or IZO. A contact hole 185, through which the drain electrode 175 is exposed, is formed through the color filter 230 and the interlayer insulating layers 180a and 180b.

An entire shape of the pixel electrode 191 may be a quadrangle, and includes a cross-shaped (plus sign shaped) central stems portion including a horizontal stem portion 191a and a vertical stem portion 191b crossing the horizontal stem portion 191a. Further, the pixel electrode 191 is divided into four sub regions by the horizontal stem portion 191a and the vertical stem portion 191b, and each sub region includes a plurality of micro branch portions 191c. Further, in the present exemplary embodiment, the pixel electrode 191 may further include an outer stem portion surrounding an outer side of the pixel electrode 191.

The micro branch portions 191c of the pixel electrode 191 have an angle of approximately 40 degrees to 45 degrees with respect to the gate line 121 or the horizontal stem portion. Further, the micro branch portions of the adjacent two sub regions may be orthogonal to each other. Further, a width of the micro branch portions is gradually increased wedge wise, or intervals between the micro branch portions 191c may be different from each other.

The pixel electrode 191 includes an extended portion 196 connected at a lower end of the vertical stem portion 191b, and having a wider area than that of the vertical stern portion 191b, and is physically and electrically connected with the drain electrode 175 through the contact hole 185 at the extended portion 197, and receives a data voltage from the drain electrode 175.

The description of the aforementioned thin film transistor Q and pixel electrode 191 is merely one example, and a structure of the thin film transistor and a design of the pixel electrode may be modified various ways including forming different liquid crystal domains in order to improve side visibility.

Light blocking layers 220a and 220b are disposed on the pixel electrode 191. The light blocking layers 220a and 220b are overlaid in open areas of a lattice structure having openings corresponding to regions of non-displaying of the desired image. The light blocking layers 220a and 220b include a first light blocking layer 220a extended in a horizontal direction to overlap the gate line 121, and a second light blocking layer 220b extended in a vertical direction to overlap the data line 171. This will be illustrated when describing a method of manufacturing the liquid crystal display. Further, the light blocking layers 220a and 220b are formed of a material (e.g., opaque material) preventing light from being transmitted therethrough. The color filters 230 are disposed to correspond to the light-passing openings of the light blocking layers 220a and 220b.

In the present exemplary embodiment, a passivation layer 183 is disposed on the light blocking layers 220a and 220b. The passivation layer 183 may have larger widths than those of the passivation-covered regions of the light blocking layers 220a and 220b, and thus it may cover so as to completely hide the light blocking layers 220a and 220b. The passivation layer 183 is made of a material that helps prevent sensitive layers, such as the light blocking layers 220a and 220b or the color filters, and the like disposed beneath the light blocking layers 220a and 220b, from being damaged during one or more damage-capable processes (e.g., ashing) of manufacturing of the liquid crystal display according to the present exemplary embodiment. In one embodiment, the passivation layer 183 includes a silicon nitride and/or a silicon oxide.

In the present exemplary embodiment, comparing one edge of the first light blocking layer 220a and one corresponding edge of the underlying gate line 121 adjacent to the first light blocking layer 220a, the one edge of the gate line 121 may be disposed closer to the pixel electrode 191 than it is adjacent to the gate line 121. This serves as an overhanging light blocking layer, where light is blocked during the manufacturing process by the combination of the overhang of the first light blocking layer 220a together with the gate line 121 or just due to the first light blocking layer 220a during the manufacturing process, and has a purpose of supporting the passivation layer 183 thereat during manufacture and thus causing the passivation layer 183 to completely cover the TFT Q and the drain contact structure 185 even when considering a process misalignment margin.

For the same reason, in the second light blocking layer 220b is disposed such that, when comparing one edge of the vertical portion 135a of the storage electrode line with an overhanging one edge of the second light blocking layer 220b adjacent to the vertical portion 135a of the storage electrode line, that one edge of the vertical portion 135a of the storage electrode line may be disposed closer to the edge of the pixel electrode 191 adjacent to the vertical portion 135a of the storage electrode line so that uncontrolled leakage light may be minimized.

In the present exemplary embodiment, the first light blocking layer 220a may be a structure that is formed after repairing the thin film transistor Q in a case where a defect is found while the progress of manufacturing the thin film transistor Q is performed. Accordingly, the first light blocking layer 220a is formed for example as a wide trough to cover the thin film transistor Q and the contact hole 185 after the TFT and contact hole are inspected for defects. The second light blocking layer 220b may be simultaneously formed for example as a trough elongated in an orthogonal direction when forming the first light blocking layer 220a.

A lower alignment layer 11 is formed on the pixel electrode 191, and the lower alignment layer 11 may be a vertical alignment layer. The lower alignment layer 11, which is a liquid crystal alignment layer, such as polyamic acid, polysiloxane, or polyimide, may be formed of any one among generally used materials for forming such alignment layers.

The upper alignment layer 21 is disposed at a portion facing the lower alignment layer 11, and respective, liquid crystal containerizing microcavities 305 are formed between the lower alignment layer 11 and the upper alignment layer 21. A liquid crystal material including liquid crystal molecules 310 is injected into the microcavities 305, and each microcavity 305 has a respective liquid crystal injection hole 307. The microcavities 305 may be formed along a column direction of the plan view of FIG. 1, that is, a vertical direction, of the pixel electrode 191. In the present exemplary embodiment, an alignment material forming the alignment layers 11 and 21 and the liquid crystal material including and the liquid crystal molecules 310 may be injected to the microcavities 305 by using capillary attraction force.

The microcavities 305 are separated from one another, in other words, divided in the vertical direction by a plurality of liquid crystal injection holes provided in holes-forming regions 307FP disposed at a portion overlapping the gate line 121, and may be plural along the direction in which the gate line 121 is extended. Each of the plurality of formed microcavities 305 may correspond to the pixel region, and the pixel region may correspond to the region displaying the image.

In the present exemplary embodiment, since the liquid crystal material is injected through the liquid crystal injection holes 307 of the holes-forming regions 307FP and into the respective microcavities 305, it is possible to form the liquid crystal display device as a monolithically integrated structure without forming a separate and glued on, upper substrate.

A transparent common electrode 270 and a lower insulating layer 350 are disposed on the upper alignment layer 21. The common electrode 270 receives the common voltage Vcom, and generates an electric field together with the pixel electrode 191, to which a corresponding data voltage is applied, to determine a direction in which the liquid crystal molecules 310 disposed in the microcavity 305 and between the two electrodes will be inclined. The common electrode 270 forms a capacitor with the pixel electrode 191 to maintain the received voltage even after the thin film transistor is turned off. The lower insulating layer 350 may be formed of a silicon nitride (SiNx) and/or a silicon oxide ($SiO_2$).

In the present exemplary embodiment, it is described that the common electrode 270 is formed on the microcavity 305, but in another exemplary embodiment, the common electrode 270 is formed at a lower portion of the microcavity 305, so that liquid crystal driving according to a horizontal electric field mode is possible.

A roof layer 360 is disposed on the lower insulating layer 350. The roof layer 360 serves as a support so that when an empty version of the microcavity 305 is formed, which is a space between the pixel electrode 191 and the common electrode 270, the empty version of the microcavity 305 retains its shape. The roof layer 360 may include a silicon oxycarbide (SiOC), photoresist, or other organic materials. In a case where the roof layer 360 includes a silicon oxycarbide (SiOC), the roof layer 360 may be formed by a chemical vapor deposition (CVD) method, and in a case where the roof layer 360 includes the photoresist, the roof layer 360 may be formed by a coating method. The silicon oxycarbide (SiOC) has high transmittance among films formable by the chemical vapor deposition method, and has low film stress, thereby achieving an advantage that the roof layer 360 is not deformed. Accordingly, in the present exemplary embodiment, when the roof layer 360 is formed of silicon oxycarbide (SiCO), a stable film through which light is controllably transmitted well may be formed.

An upper insulating layer 370 is disposed on the roof layer 360. The upper insulating layer 370 may be in contact with an upper surface of the roof layer 360. The upper insulating layer 370 may be formed of a silicon nitride (SiNx) or a silicon oxide (SiO2). A planarizing capping layer 390 is disposed on the upper insulating layer 370. The capping layer 390 is in contact with an upper surface and a side surface of the upper insulating layer 370, and the capping layer 390 covers and seals the liquid crystal injection holes 307 of the respective microcavities 305 that had been exposed by the LC injection enabling region 307FP. The capping layer 390 may be formed of a thermosetting resin, a silicon oxycarbide (SiOC), or of a graphene.

In a case where the capping layer 390 is formed of grapheme, graphene has a characteristic of high impermeability for gas including helium, so that graphene may serve as a capping layer blocking the liquid crystal injection holes 307, and grapheme is a material formed by a carbon bond, so that the liquid crystal material is not contaminated even though grapheme is in contact with the liquid crystal material. In addition, graphene may also serve to protect the liquid crystal material from external oxygen and moisture.

An overcoat layer (not illustrated) formed of an inorganic layer or an organic layer may be disposed on the capping layer 390. The overcoat layer serves to protect the liquid crystal molecules 310 injected to the microcavities 305 from an external impact, and to further planarize the layer.

In the present exemplary embodiment, as illustrated in FIG. 2, the liquid crystal injection enabling holes region 307FP is formed between the microcavities 305 adjacent in the vertical direction. In other words, it has a trough like shape with the holes lining opposed interior sides of the trough shape. The first light blocking layer 220a covering the thin film transistor Q and the contact hole 185 is formed within the liquid crystal injections enabling region 307FP. The first light blocking layer 220a is formed of a material capable of blocking light in order to decrease a leakage current of the thin film transistor Q by external light and to prevent a decrease in a contrast ratio due to reflective light.

The capping layer 390 covers the first light blocking layer 220a, as well as the liquid crystal injection hole 307, and fills the liquid crystal injections enabling hole region 307FP between the microcavities 305 and the first light blocking layer 220a.

As illustrated in FIG. 3, in the present exemplary embodiment, a partition forming portion PWP is formed between the microcavities 305 adjacent in a horizontal direction. The partition forming portion PWP may be formed in a direction in which the data line 171 is extended. Further, the partition forming portion PWP is disposed to correspond to the second light blocking layer 220b, and the passivation layer 183, the common electrode 270, and the lower insulating layer 350 are disposed between the partition forming portion PWP and the second light blocking layer 220b. The partition forming portion PWP is a portion in which the roof layer 360 is collapsed so as to fill the space between noncontiguous ones of the microcavities 305 adjacent to each other in the horizontal direction.

A polarizer (not illustrated) is disposed under the insulating substrate 110 and on the upper insulating layer 370. The polarizer may include a polarizing element generating polarized light and a tri-acetyl-cellulose (TAC) layer for securing durability, and depending on the exemplary embodiment, directions of transmissive axes of an upper polarizing panel and a lower polarizer may be vertical or parallel to each other.

Hereinafter, an exemplary embodiment of manufacturing the aforementioned liquid crystal display will be described with reference to FIGS. 4 to 32. FIGS. 4 to 32 are triplets of one top plan view and two corresponding cross-sectional views for describing a method of manufacturing the liquid crystal display according to the exemplary embodiment of the present disclosure. FIGS. 5 and 6 are a cross-sectional view taken along cut line V-V of FIG. 4, and a cross-sectional view taken along cut line VI-VI of FIG. 4, respectively. FIGS. 8 and 9 are a cross-sectional view taken along cut line VIII-VIII of FIG. 7, and a cross-sectional view taken along cut line IX-IX of FIG. 7, respectively. FIGS. 11 and 12 are a cross-sectional view taken along cut line XI-XI of FIG. 10, and a cross-sectional view taken along cut line XII-XII of FIG. 10, respectively. FIGS. 13, 15, 17, 19, 21, 23, 25, 27, 29, and 31 are cross-sectional views taken along cut line XI-XI of FIG. 10, and illustrate process steps after manufacturing steps of FIGS. 10 to 12. FIGS. 14, 16, 18, 20, 22, 24, 26, 28, 30, and 32 are cross-sectional views taken along cut line XII-XII of FIG. 10, and illustrate process steps after manufacturing steps of FIGS. 10 to 12.

Figure 4:
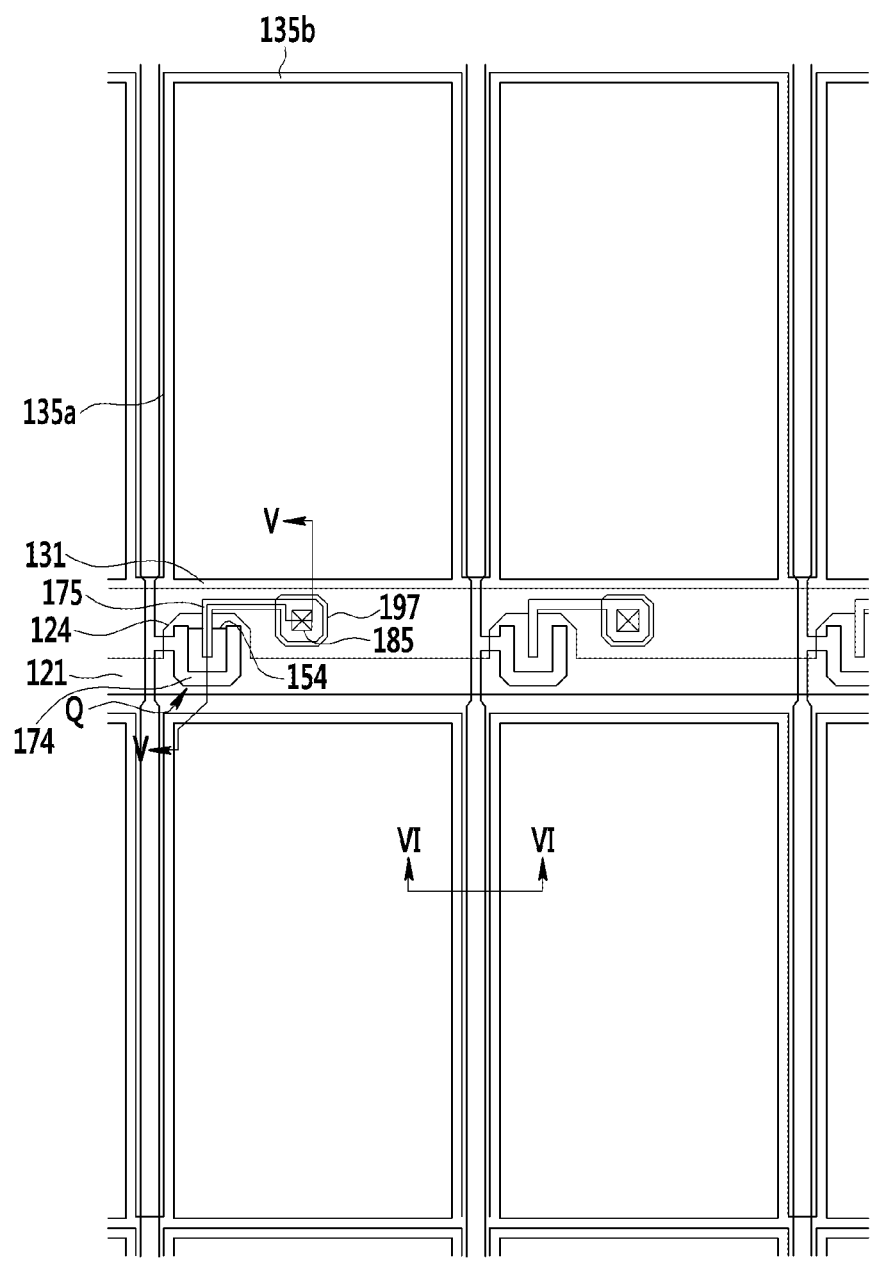
FIGS. 4 to 32 are top plan views and cross-sectional views for describing a method of manufacturing the liquid crystal display according to the exemplary embodiment.
Figure 5:
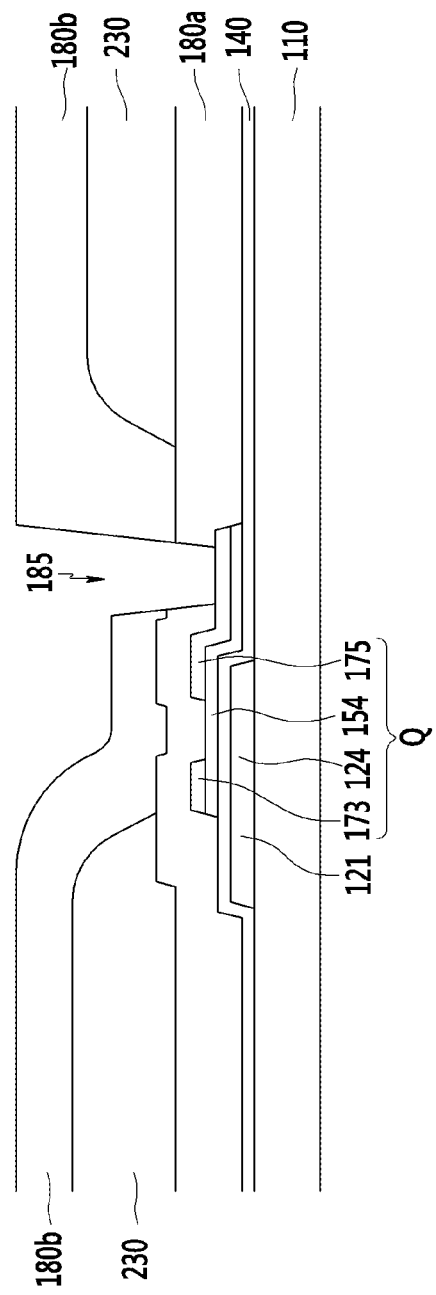
Figure 6:
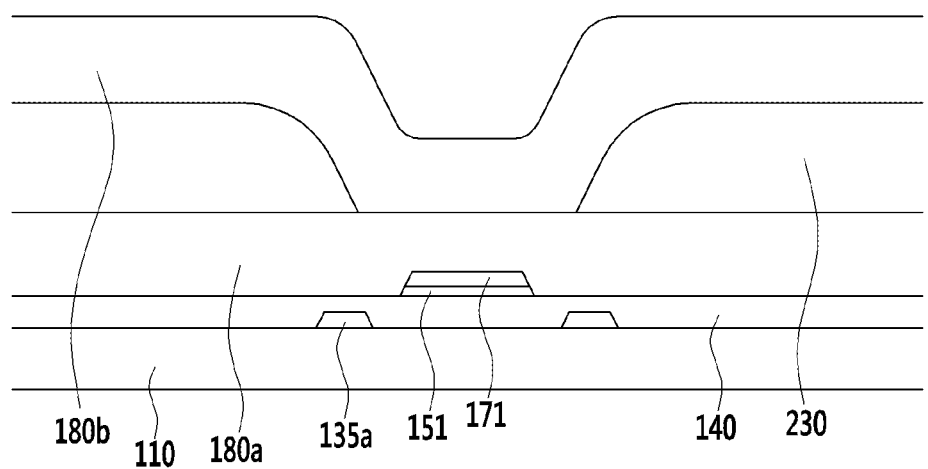

Referring first to the triplet consisting of FIGS. 4 to 6, in order to form a generally known switching element on a substrate 110, the gate line 121 extended in the horizontal direction is formed, and the gate insulating layer 140 is formed on the gate line 121, the semiconductor layers 151 and 154 are formed on the gate insulating layer 140, and the source electrode 173 and the drain electrode 175 are formed. In this case, the data line 171 connected with the source electrode 173 may be formed to be extended in the vertical direction while crossing the gate line 121. As is understood from sectional indicating line V-V in FIG. 4, the corresponding cross sectional view of FIG. 5 shows the structures being monolithically integrally built up one on another in the horizontally extending trough area between two pixel electrode areas within a vertical column of such pixel electrode areas. Additionally, as is understood from sectional indicating line VI-VI in FIG. 4, the corresponding cross sectional view of FIG. 6 shows the structures being monolithically integrally built up one on another in the vertically extending trough area between two pixel electrode areas within a horizontal row of such pixel electrode areas.

During the monolithically integrated build up of features, the first interlayer insulating layer 180a is formed on the data conductors 171, 173, and 175 including the source electrode 173, the drain electrode 175, and the data line 171, and the exposed portion of the semiconductor layer 154.

The color filter 230 is formed at a position corresponding to the pixel region on the first interlayer insulating layer 180a, and the color filter 230 may be formed in a stripe form (e.g., where each of successive such stripes has a respective color, R, G, B, R, G, etc.) extending in a vertical direction.

The second interlayer insulating layer 180b covering the color filter 230 is formed on the color filter, and the contact hole 185 passing through the first interlayer insulating layer 180a, the color filter 230, and the second interlayer insulating layer 180b is formed.

Figure 7:
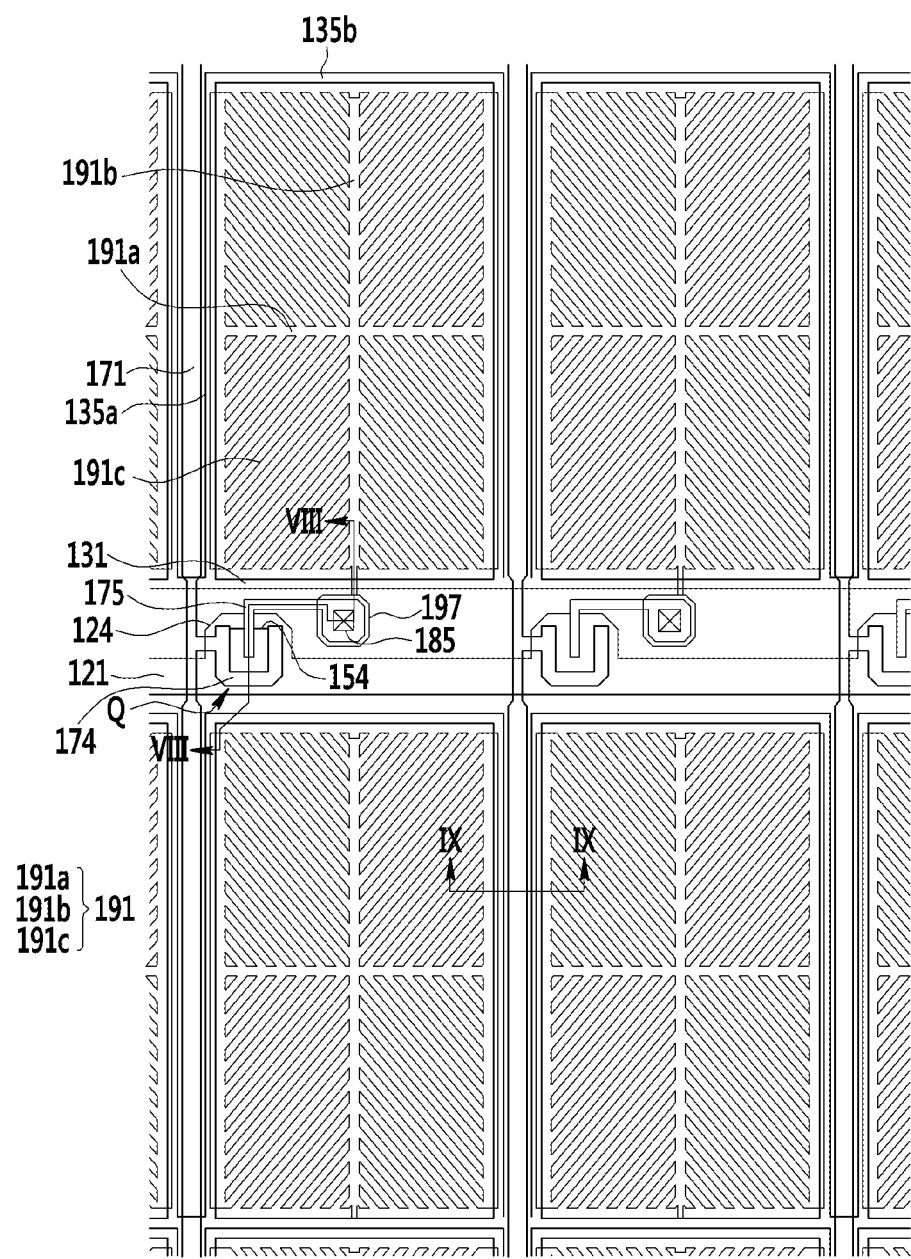
Figure 8:
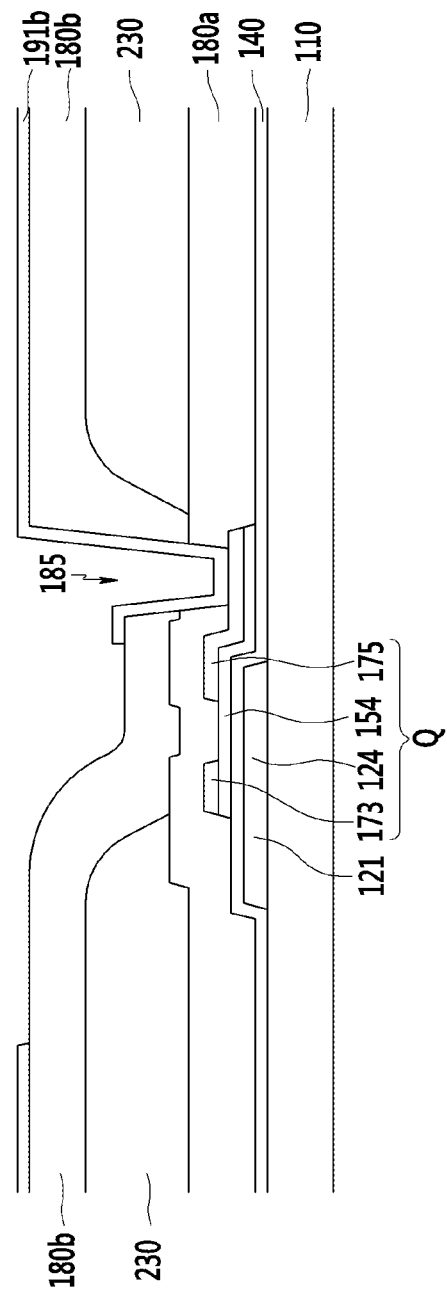
Figure 9:
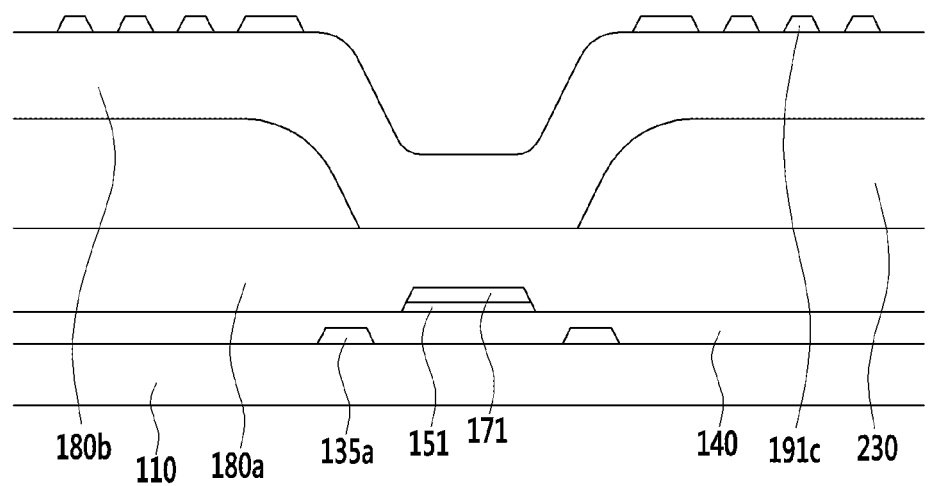

Referring to FIGS. 7 to 9, the pixel electrode 191 is formed on the second interlayer insulating layer 180b. In this case, the pixel electrode 191 is formed in a structure including the cross-shaped stem portions 191a and 191b, and the micro branch portions 191c by using a photolithography process after applying a transparent conductive material, such as ITO or IZO, as described in the exemplary embodiment described with reference to FIGS. 1 to 3.

Figure 10:
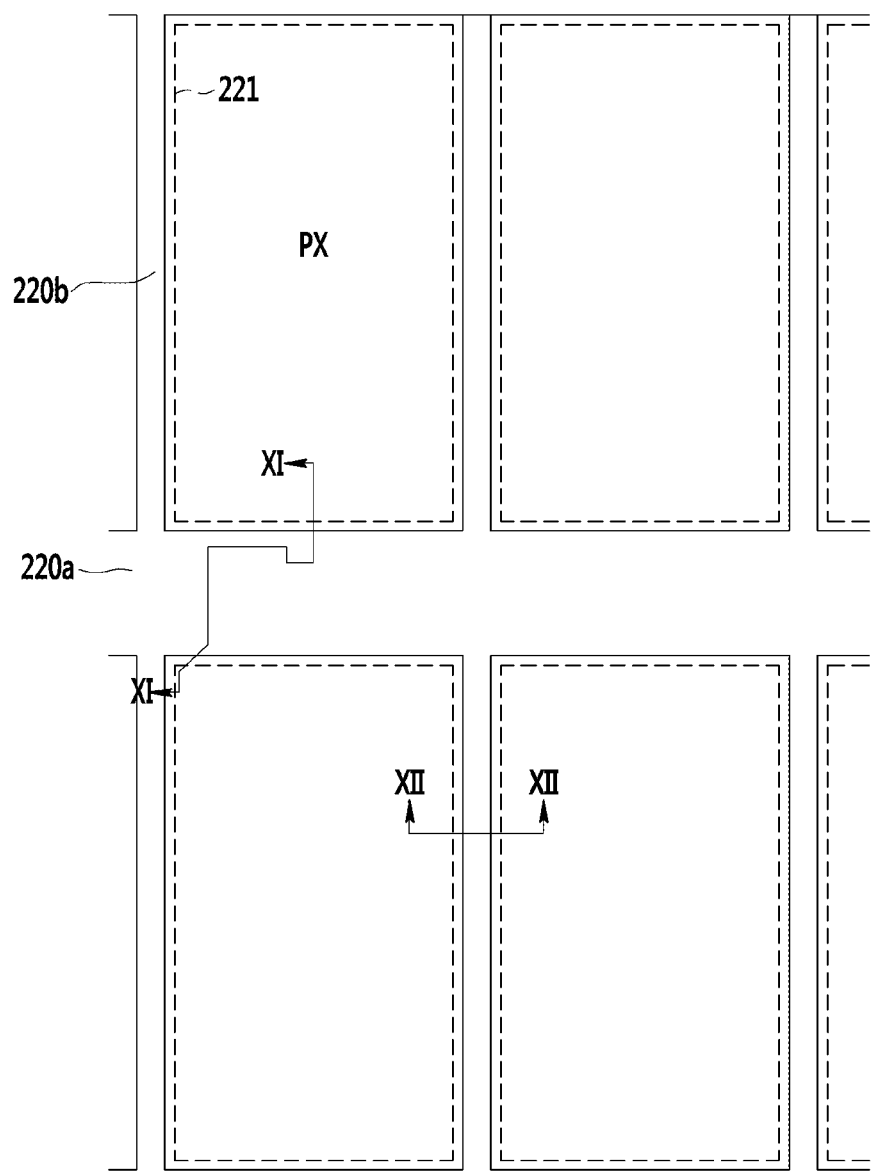
Figure 11:
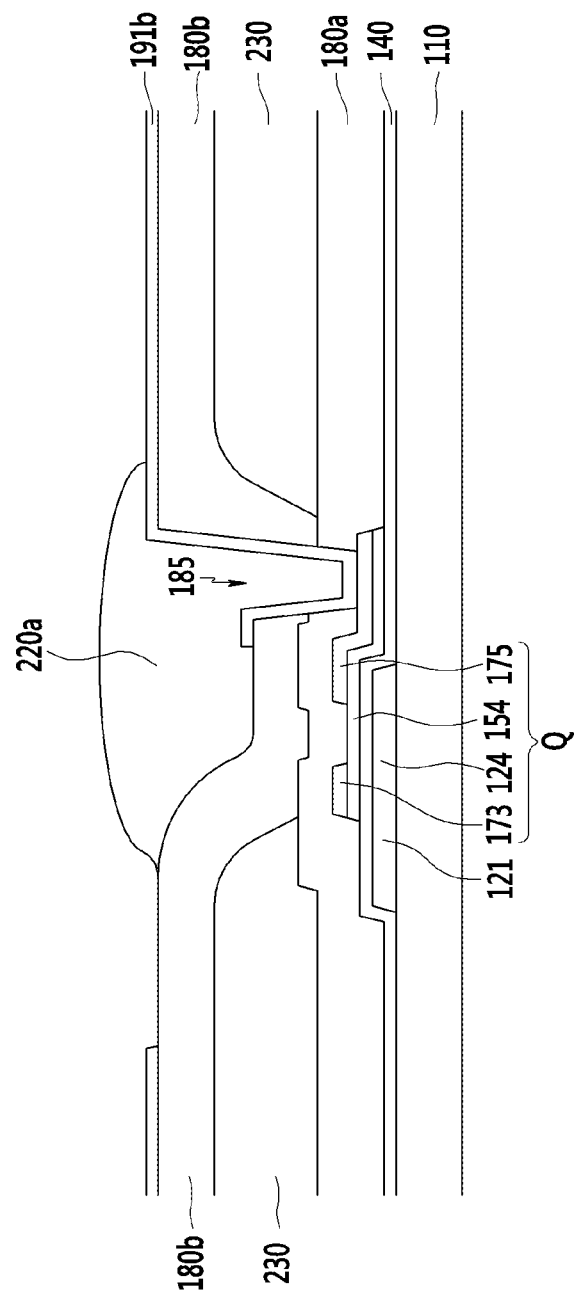
Figure 12:
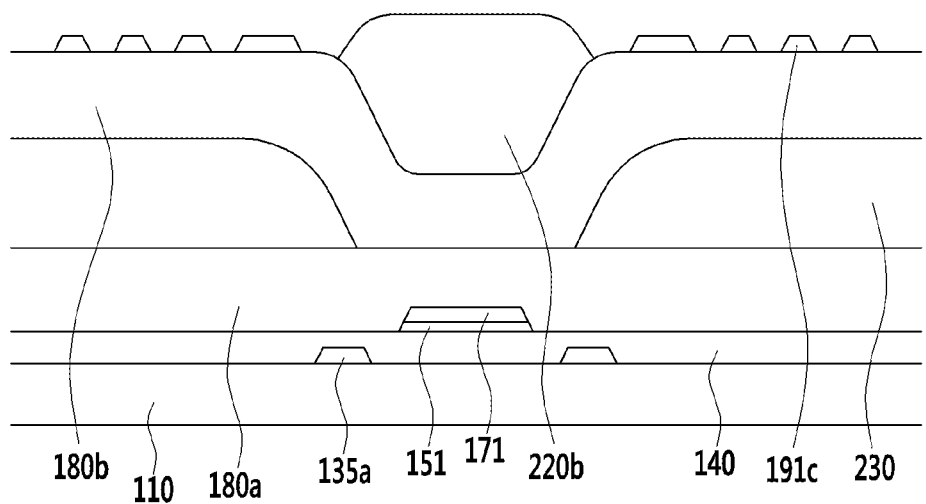

Referring to FIGS. 10 to 12, the respectively extending, horizontal and vertical light blocking layers 220a and 220b are formed on the pixel electrode 191 and the second interlayer insulating layer 180b. The light blocking layers 220a and 220b may be formed in a matrix form so as to include the first light blocking layer 220a extended in the horizontal direction and the second light blocking layer 220b extended in the vertical direction. The light blocking layers 220a and 220b may be formed of a same blanket deposited material 220 that is patterned after deposition to have openings 221 at the respective area portions corresponding to the pixel aperture regions PX.

The first light blocking layer 220a is formed to cover the thin film transistor Q and the contact hole 185. Further, the second light blocking layer 220b is formed to overlap the data line 171.

In a case where a defect of the thin film transistor Q and/or its contact to the pixel electrode 191b is detected by testing before the step of forming the first light blocking layer 220a, a process of repairing the thin film transistor Q and/or drain contact may be carried out. Then the light blocking layer 220 is blanket deposited and thereafter patterned to thereby define the openings 221 and respective horizontally and vertically extending portions 220a and 220b.

Figure 13:
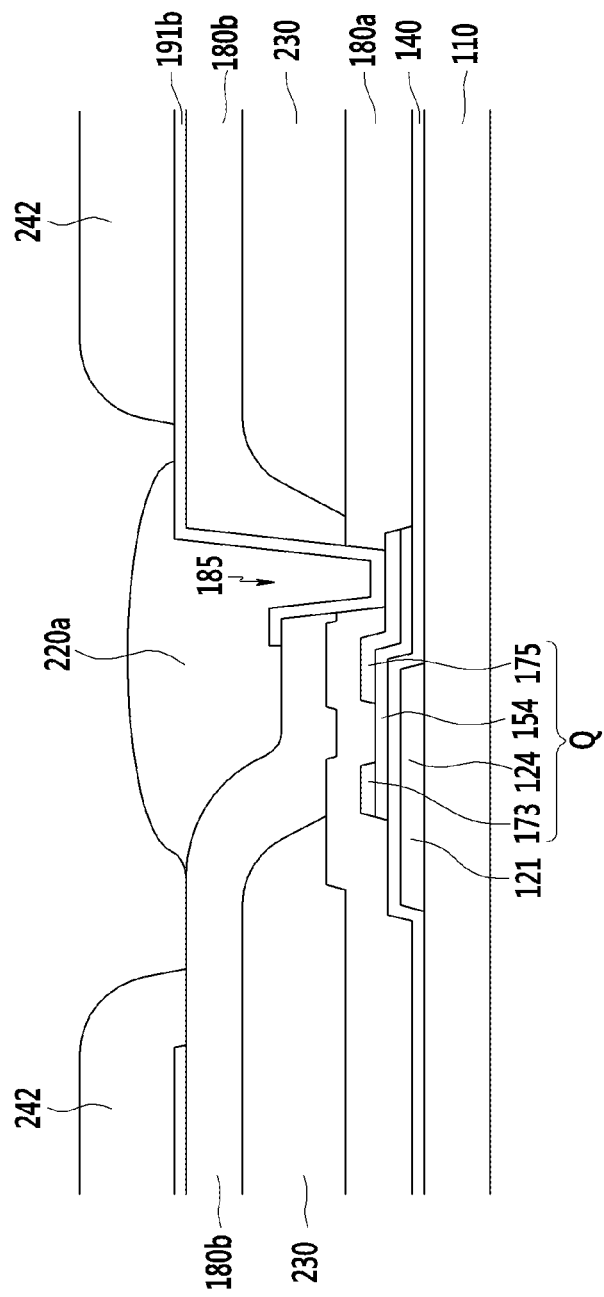
Figure 14:
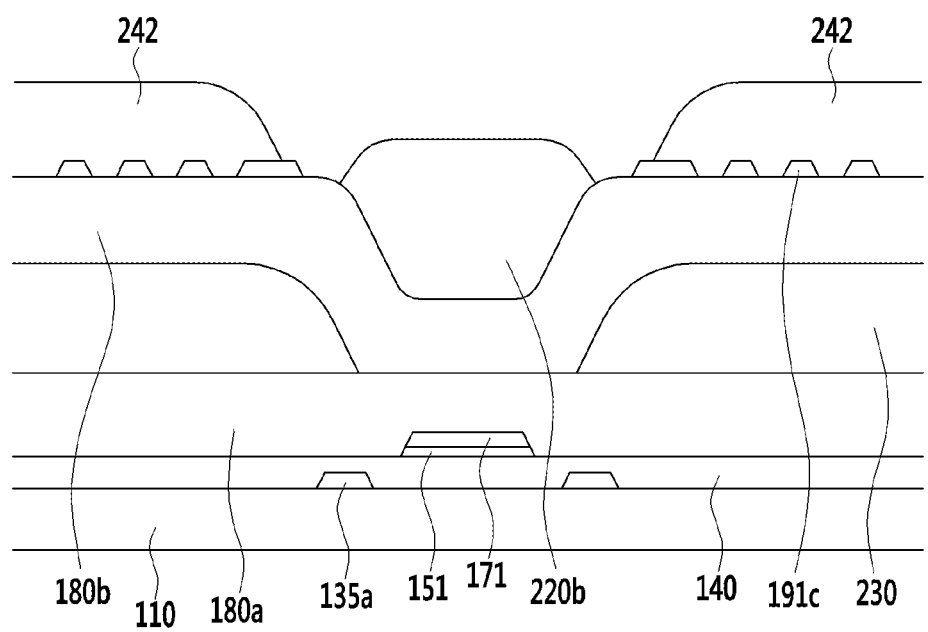

Referring to FIGS. 13 and 14, a first sacrificial layer 242 is formed at a portion corresponding to a pixel region disposed around the light blocking layers 220a and 220b. The first sacrificial layer 242 may serve to prevent the layer of the pixel electrode 191 and the like from being damaged during a passivation material layer patterning process carried out in a subsequent process. The first sacrificial layer 242 may be formed by using a negative photoresist process.

Figure 15:
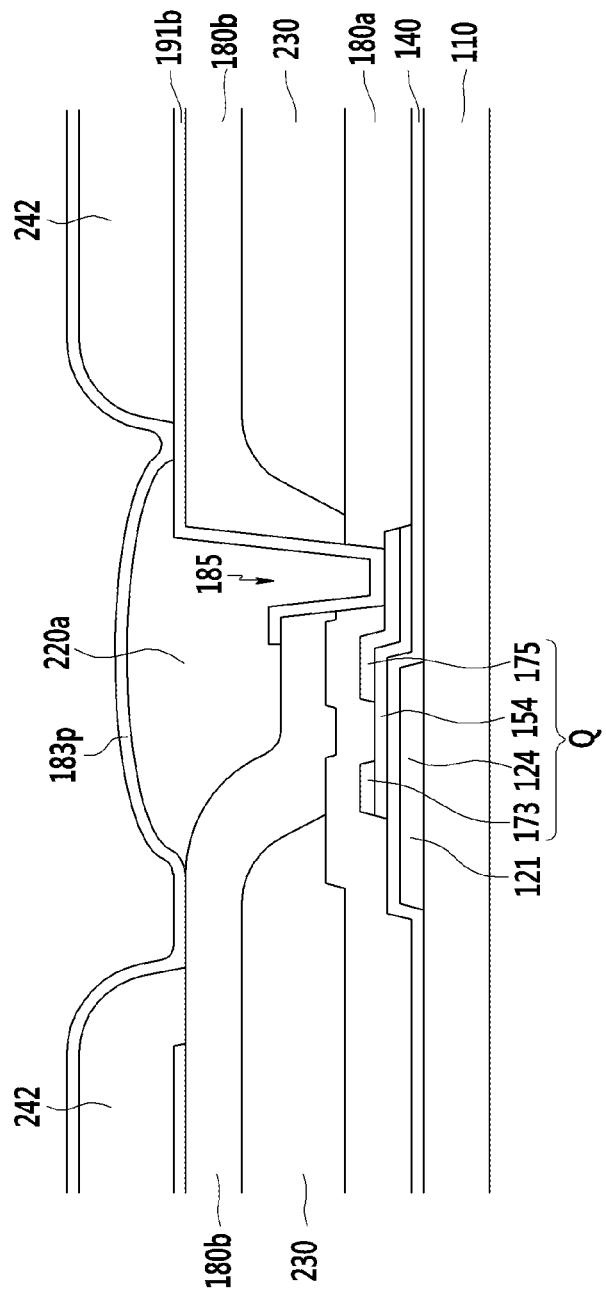
Figure 16:
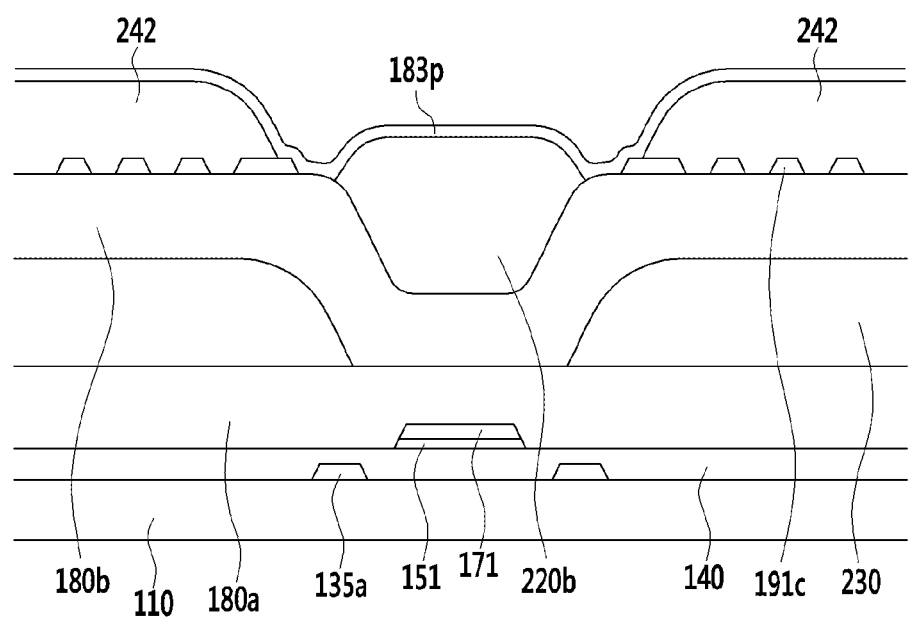

Referring to FIGS. 15 and 16, a passivation material layer 183p is blanket formed so as to cover the first sacrificial layer 242 and the light blocking layers 220a and 220b. The passivation material layer 183p may be formed to cover most of the regions on the substrate 110. The passivation material layer 183p may include a silicon nitride (SiNx) and/or a silicon oxide (SiOx).

Figure 17:
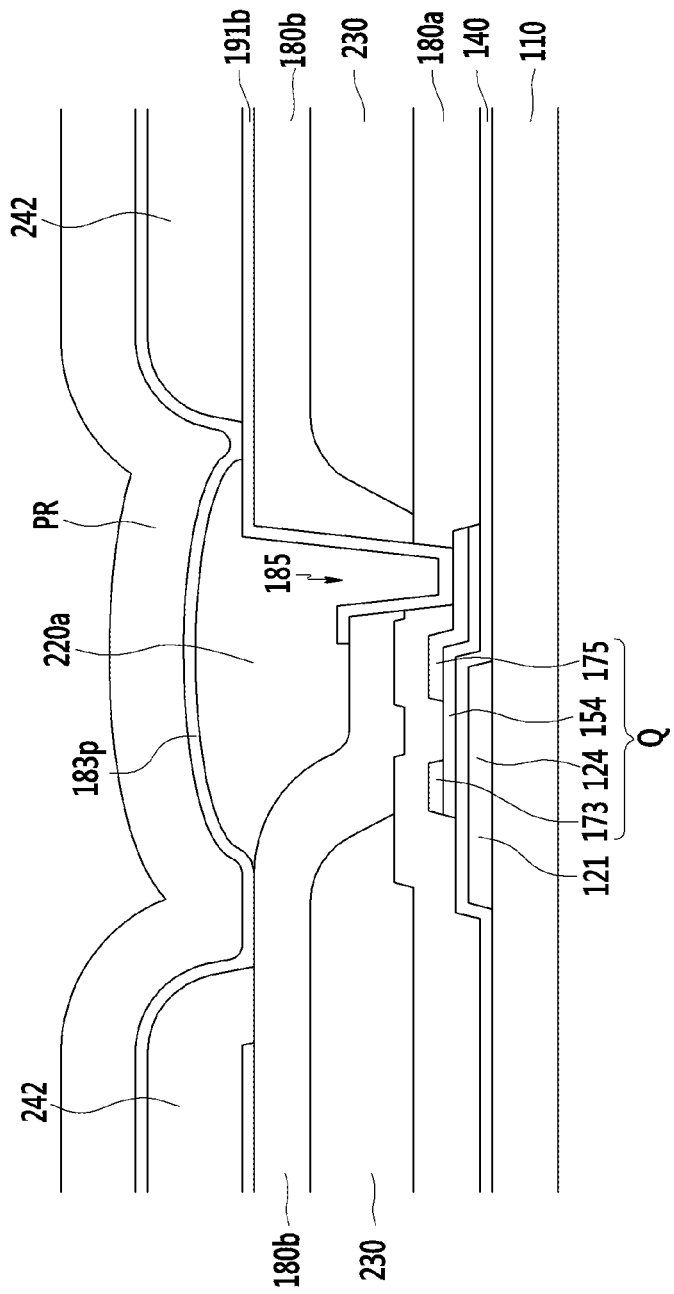
Figure 18:
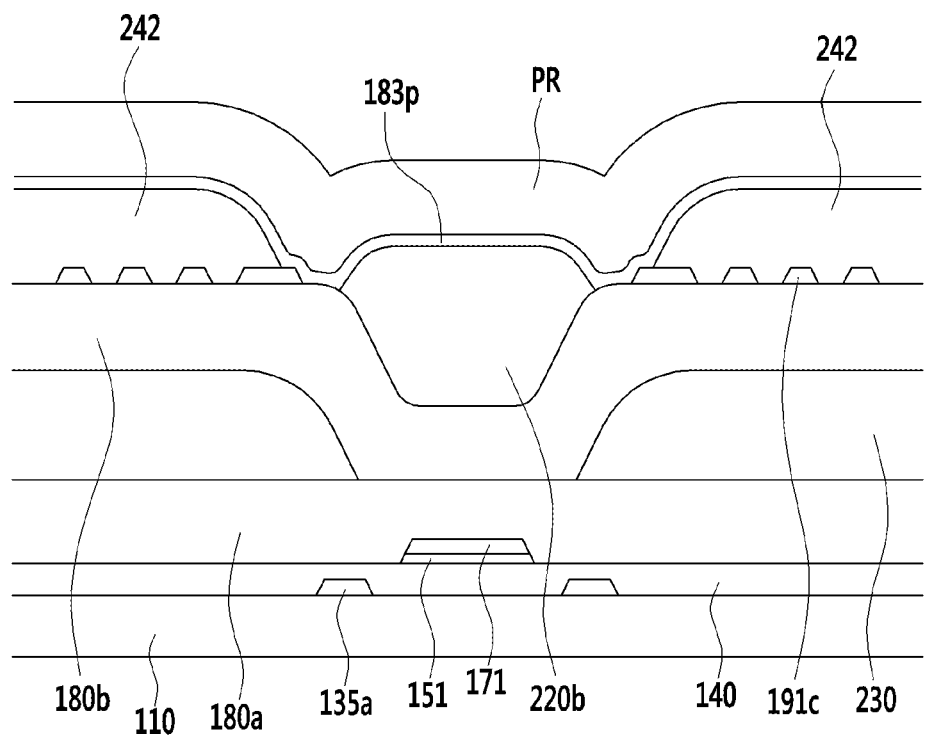

Referring to FIGS. 17 and 18, a photosensitive film PR is applied on the passivation material layer 183p. The photosensitive film PR may be formed on the substrate 110 so as to cover most of the regions, and may be formed of positive development type photoresist.

Figure 19:
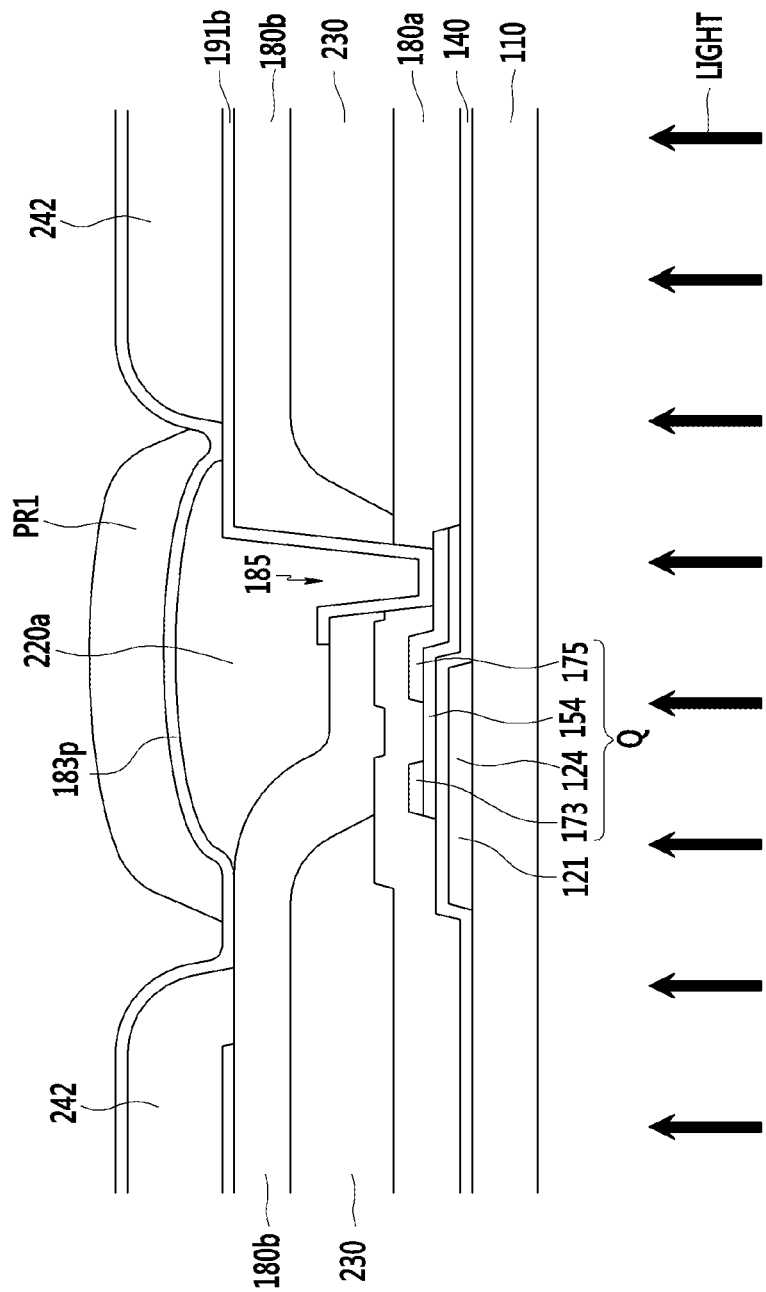
Figure 20:
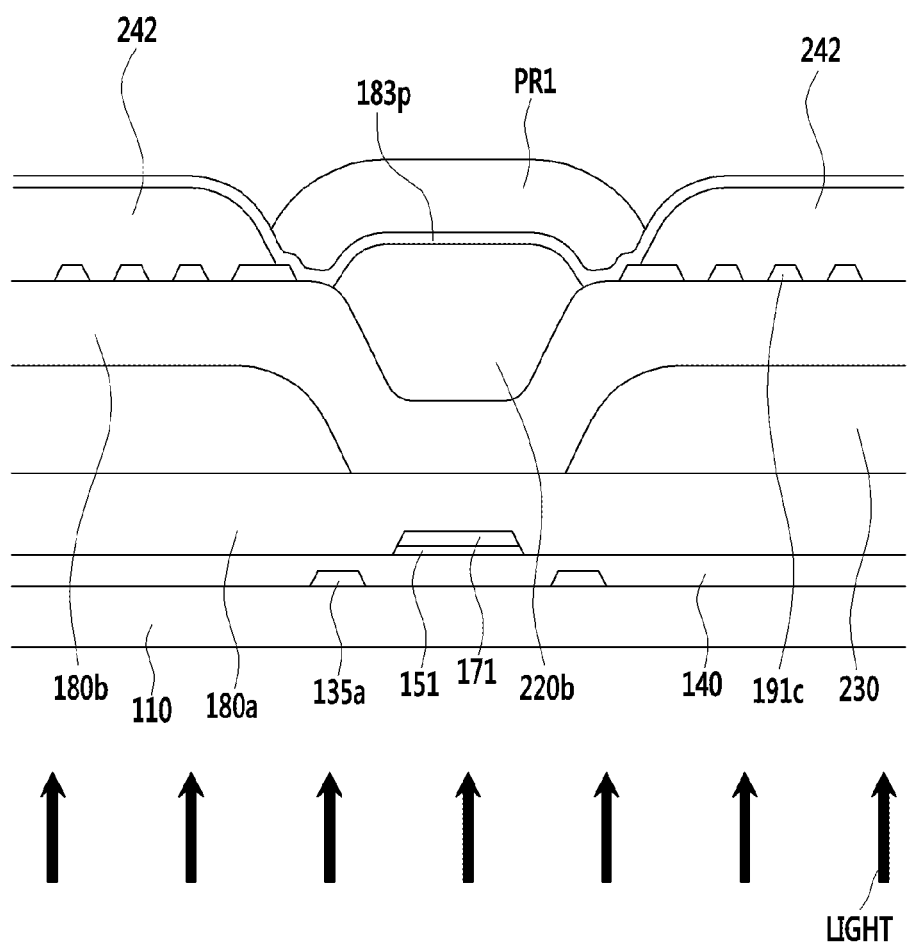

Referring to FIGS. 19 and 20, light LIGHT is irradiated from under the substrate 110 to the liquid crystal display according to the present exemplary embodiment. The light LIGHT incident after passing through the substrate 110 may be irradiated to the photosensitive film PR. In this case, the light blocking layers 220a and 220b serve as the light blocking layers or masks for the patterning of the overlying photosensitive film PR, so that the light is not irradiated to the photosensitive film PR disposed directly above the light blocking layers 220a and 220b and a self-aligned patterning of the overlying photosensitive film PR therefore takes place.

Then, as illustrated in FIGS. 19 and 20, the photosensitive film PR disposed in a region in which light is not blocked by the light blocking layers 220a and 220b is selectively removed by a development process, and a photosensitive film pattern PR1 disposed directly above the light blocking layers 220a and 220b is formed in a self-aligned manner. The passivation material layer 183p is exposed to the outside at the portion in which the photosensitive film PR is removed.

In this case, one edge of the gate line 121 or one edge of the storage electrode line vertical portion 135a is disposed closer to the adjacent pixel electrode 191 than a corresponding one edge of the light blocking layers 220a and 220b, so that the resulting photosensitive film pattern PR1 may have a larger width than those of the light blocking layers 220a and 220b taken alone and may protectively cover the edges of the light blocking layers 220a and 220b. Accordingly, the PR1-covered portion of the passivation layer 183 may be preserved so as to completely cover the light blocking layers 220a and 220b in a subsequent process while portions of the passivation layer 183 that are not protectively covered by the PR1 photosensitive film pattern will be selectively removed as shall be seen in the next-discussed figures.

Figure 21:
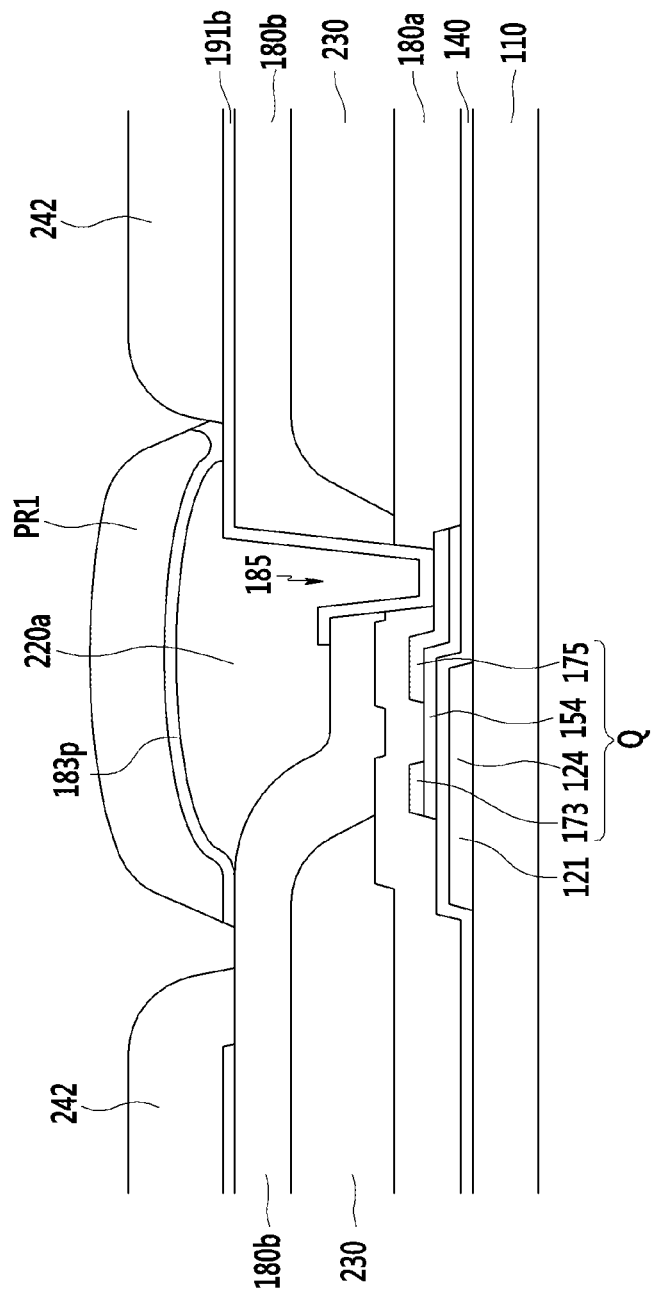
Figure 22:
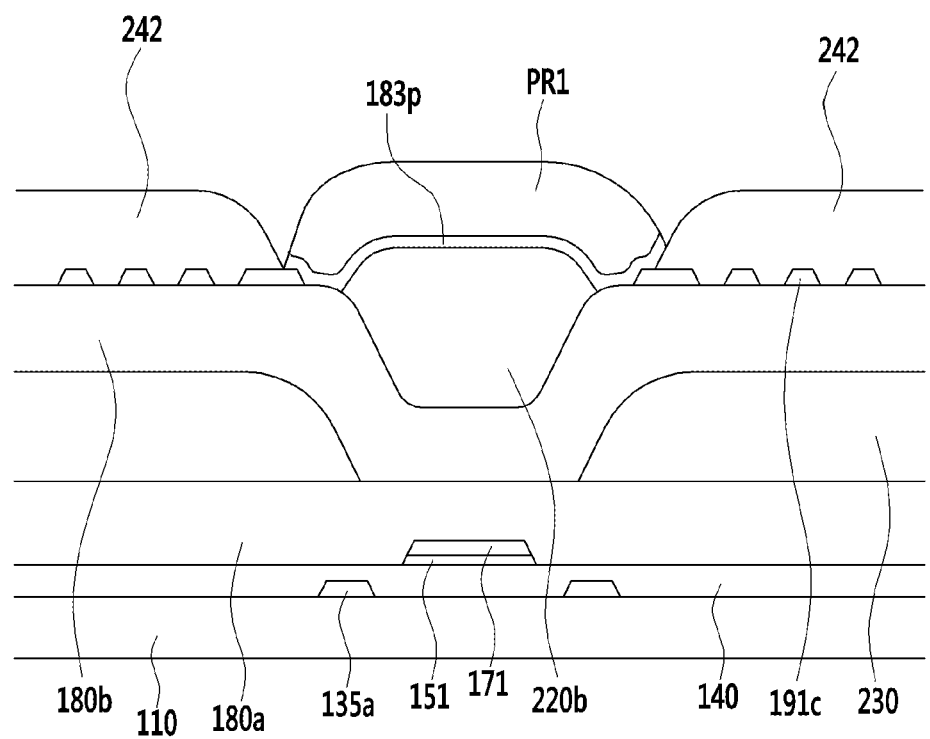

Referring to FIGS. 21 and 22, the passivation material layer 183p is patterned (exposed portions are selectively removed) by using the photosensitive film pattern PR1 as a mask. In this case, the first sacrificial layer 242 is exposed to the outside once the passivation material layer 183 above it is selectively removed.

Figure 23:
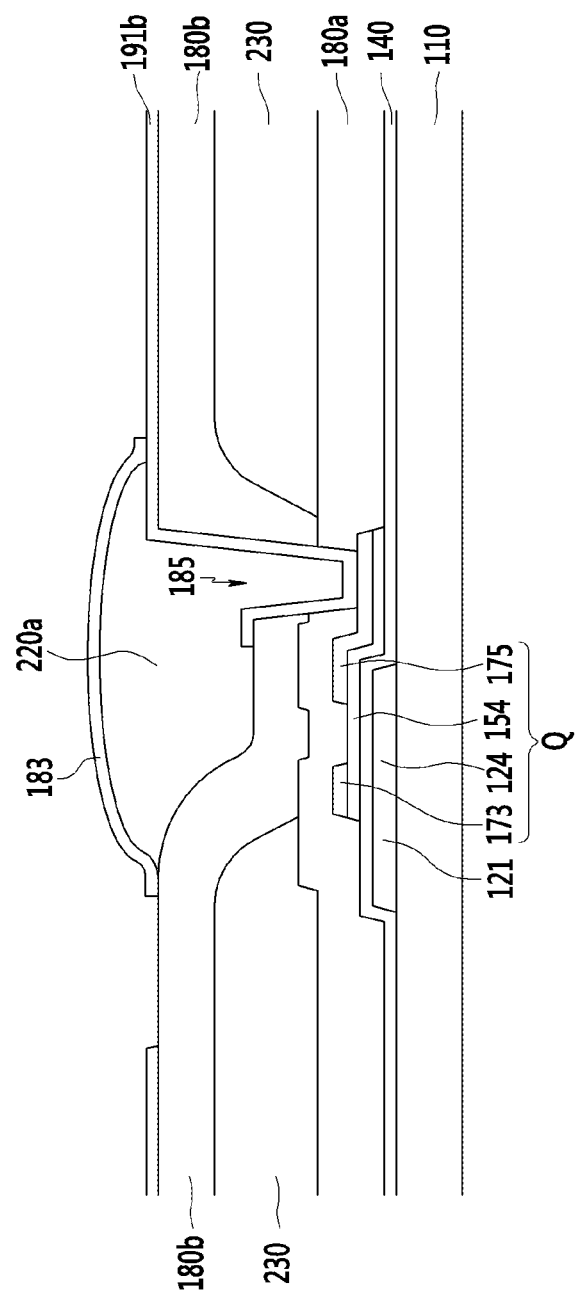
Figure 24:
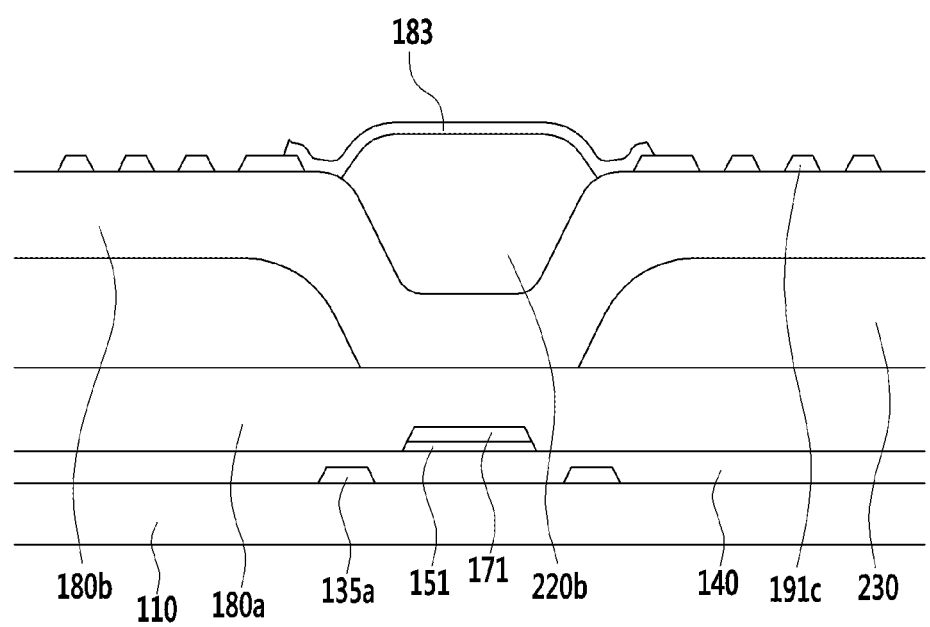

Referring to FIGS. 23 and 24, the left-intact photosensitive film pattern PR1 is removed through an appropriate and selective removal process (e.g., a string process). The left-intact passivation layer 183 has a form covering the light blocking layers 220a and 220b as shown in FIGS. 23 and 24.

Figure 25:
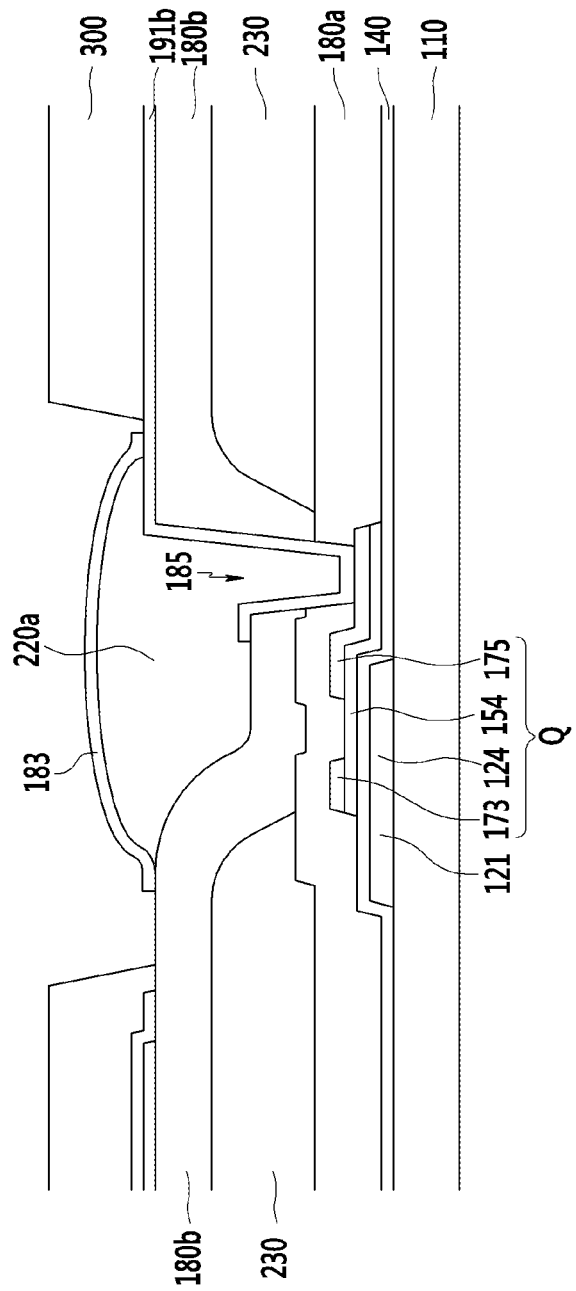
Figure 26:
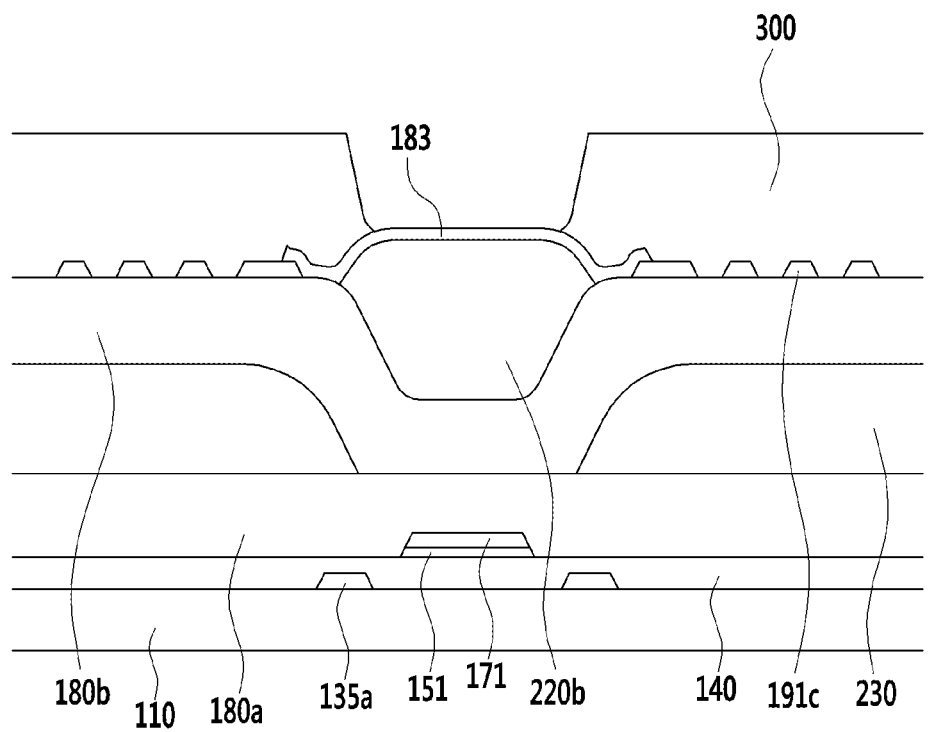

Referring to FIGS. 25 and 26, a second sacrificial layer 300 is formed on the pixel electrode 191. The second sacrificial layer 300 may be formed to correspond to the pixel region while leaving an opening to the passivation layer 183 as illustrated in FIG. 25. Further, as illustrated in FIG. 26, the second sacrificial layer 300 may be formed to be opened in the direction in which the data line 171 is extended.

Figure 27:
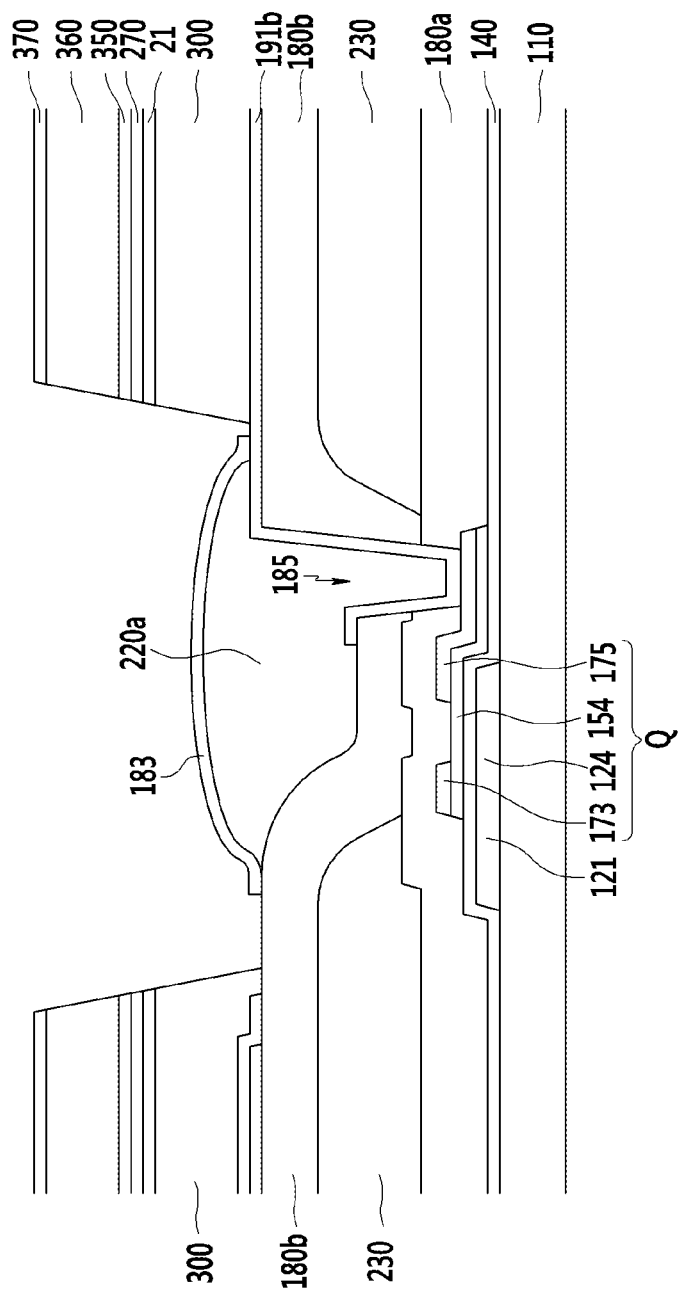
Figure 28:
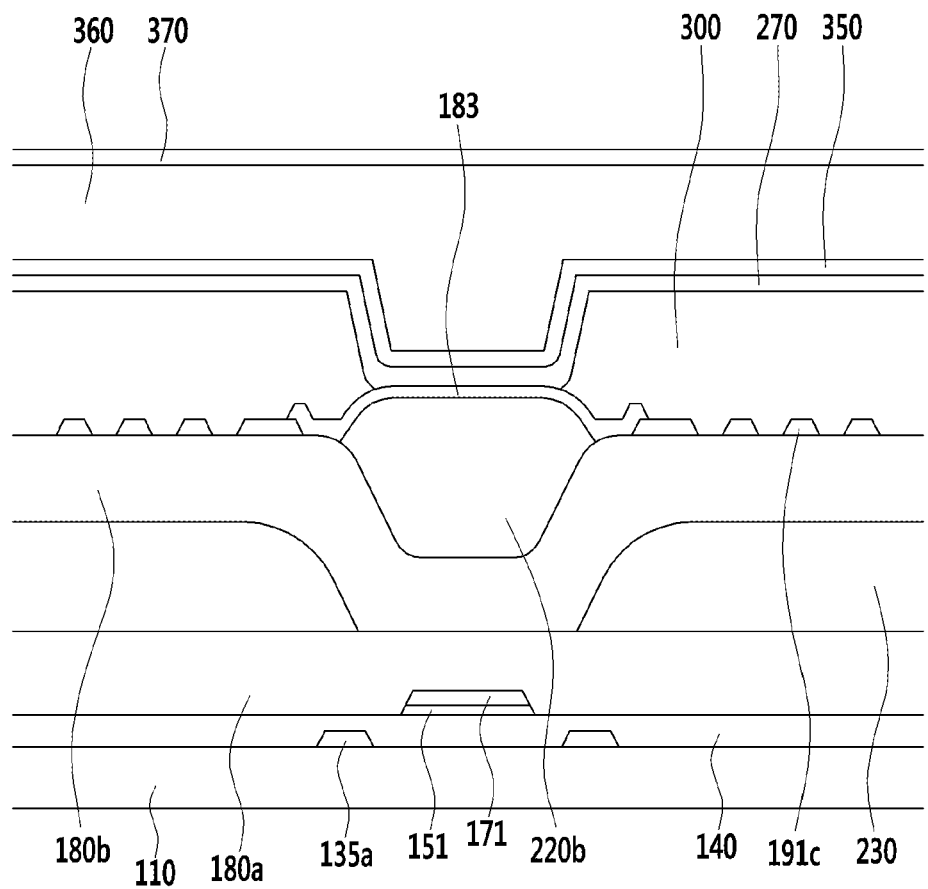

Referring to FIGS. 27 and 28, further monolithic integration steps are used to form the common electrode 270, the lower insulating layer 350, the roof layer 360, and the upper insulating layer 370 in the recited order and on top of the second sacrificial layer 300. In this case, the common electrode 270, the lower insulating layer 350, and the roof layer 360 cover the portion of the second sacrificial layer 300 opened along the data line 171, and the roof layer 360 may form the partition forming portion PWP disposed along the direction in which the data line 171 is extended.

Figure 29:
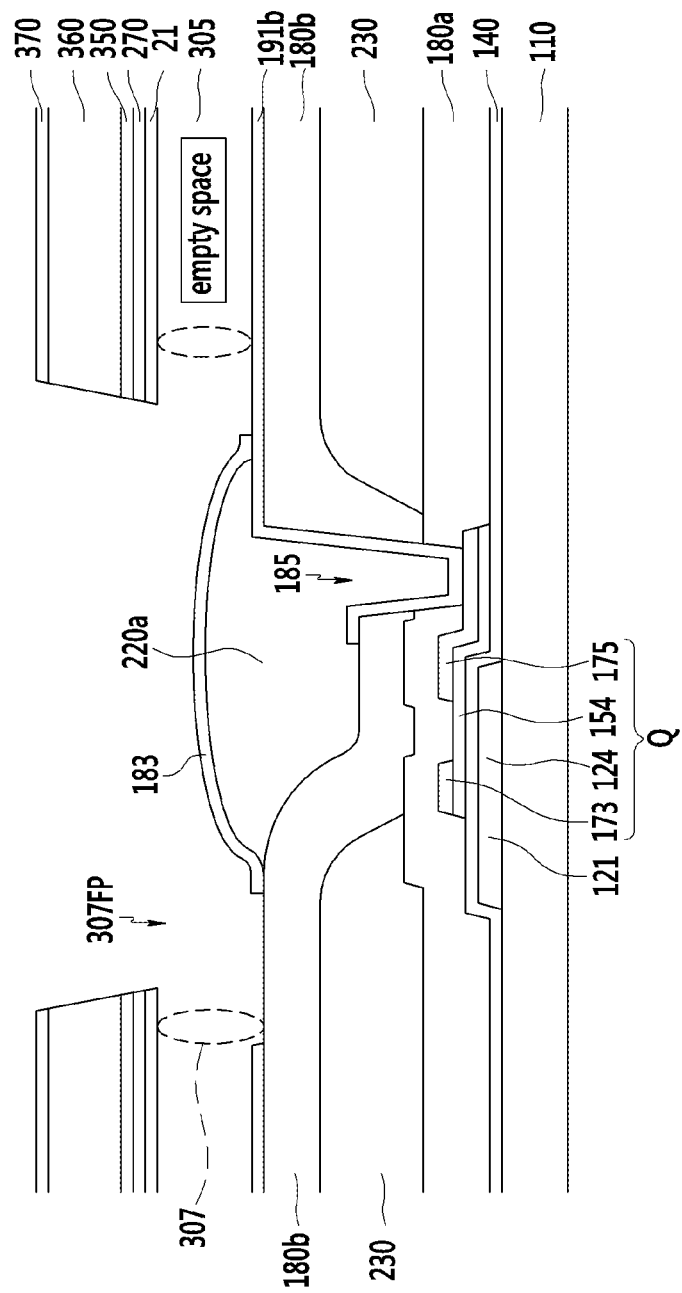
Figure 30:
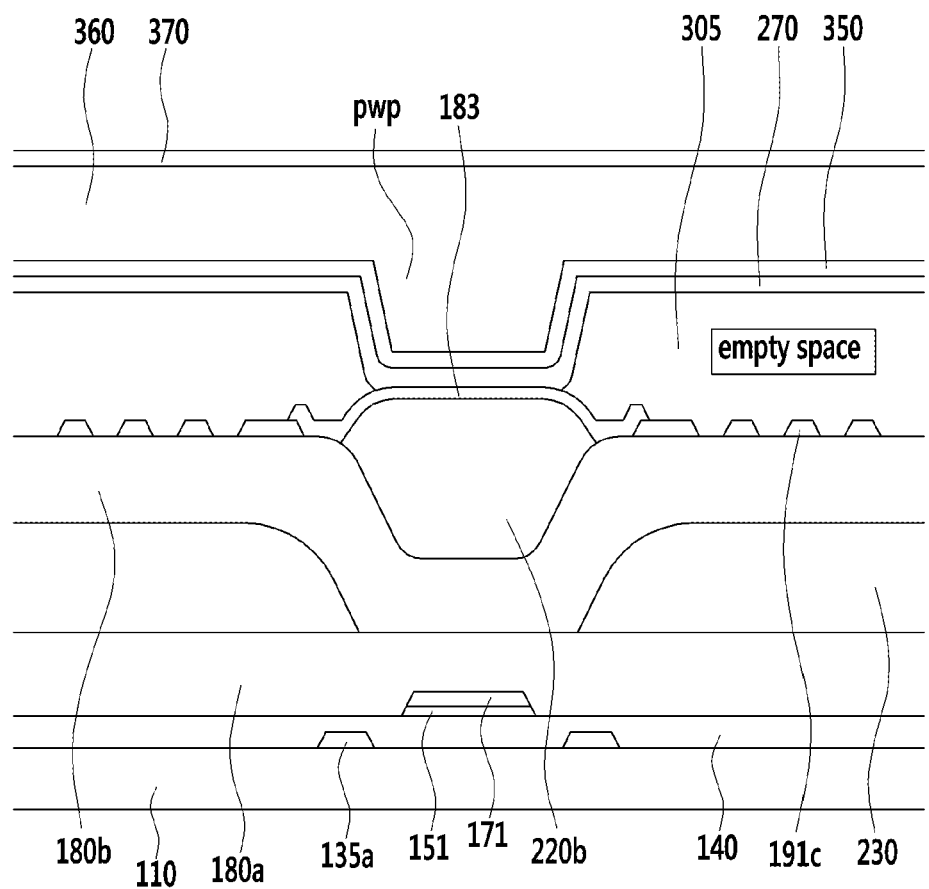

Referring to FIGS. 29 and 30, the second sacrificial layer 300 is selectively removed by an oxygen ($O_2$) ashing process or by a selective wet etching method operating through the liquid crystal injection holes formed in trough region 307FP. In this case, the microcavities 305 having the respective liquid crystal injection holes 307 are formed. Since the sacrificial layer 300 is selectively removed in the region of the microcavities 305, the microcavities 305 are left behind in respective empty states. The liquid crystal injection holes 307 may be formed in the direction in which the gate line 121 is extended.

As mentioned, oxygen ($O_2$) plasma processing may be performed to selectively ash away the second sacrificial layer 300. The purpose of the oxygen ($O_2$) plasma processing is to assure that the liquid crystal material is able to fully enter into the spaces previously occupied by the second sacrificial layer 300. If the left-behind passivation layer 183 where not present, the light blocking layers 220a and 220b would be exposed to the outside by way of the liquid crystal injection holes forming, trough region 307FP, and the so-exposed light blocking layers 220a and 220b may then be damaged during the process of selectively removing the second sacrificial layer 300. If that were allowed to happen, the light blocking layer 220a might not be able to adequately perform its function of covering the thin film transistor Q and the contact hole 185, thereby degrading reliability of the liquid crystal display. However, in the present exemplary embodiment, since the passivation layer 183 is preserved and has a structure surrounding the light blocking layers 220a and 220b, the light blocking layers 220a and 220b are prevented from being damaged during the process of selectively removing the second sacrificial layer 300.

Figure 31:
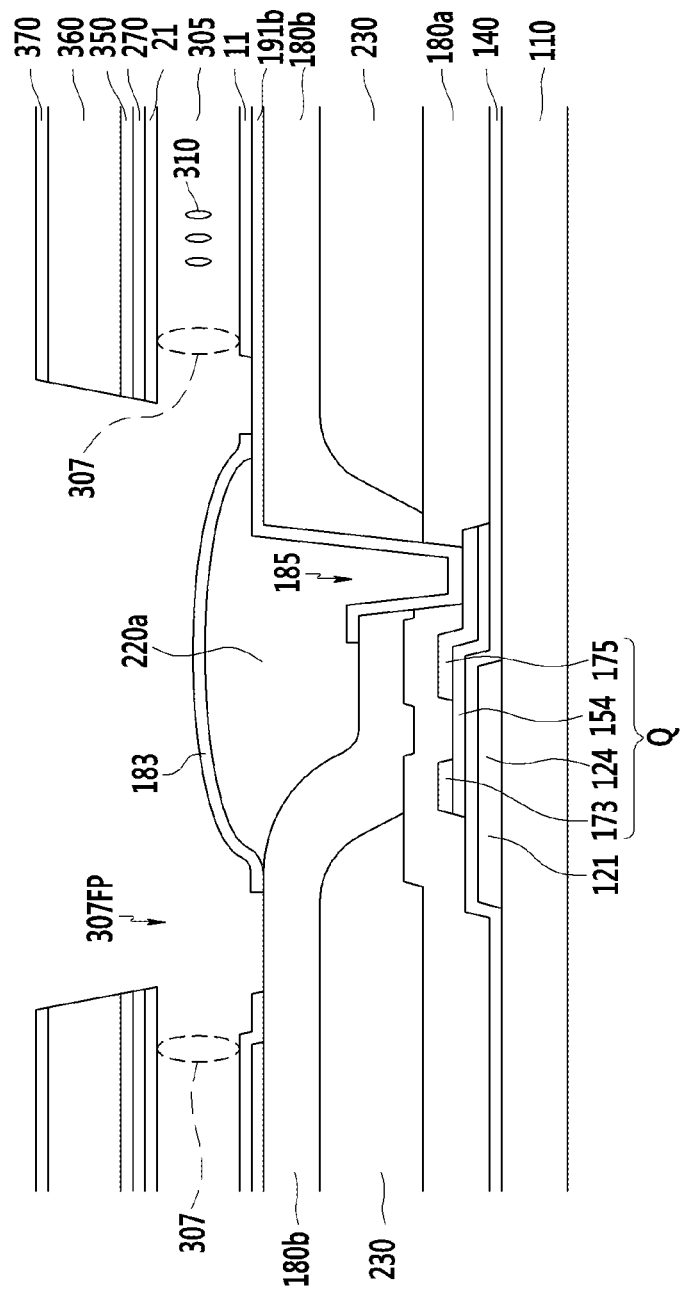
Figure 32:
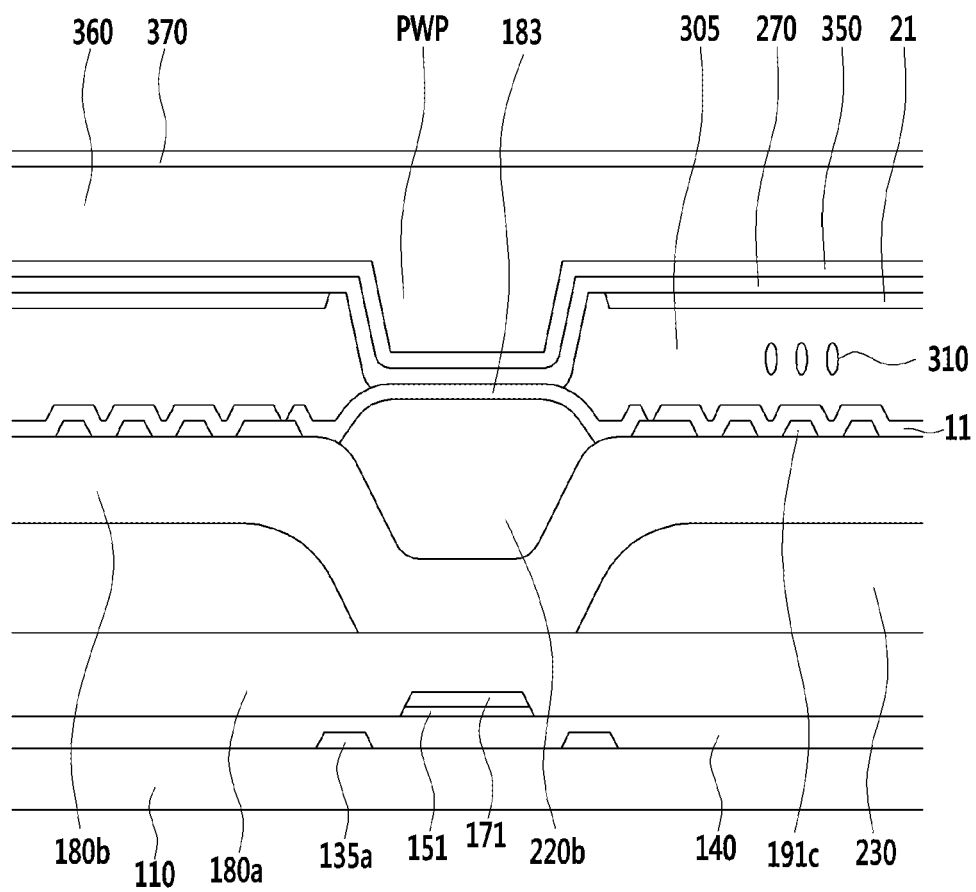

Referring to FIGS. 31 and 32, the alignment layers 11 and 21 are formed on the pixel electrode 191 and the common electrode 270 by injecting an alignment material through the liquid crystal injection holes 307 to coat the interior walls of the microcavities. A bake process is performed after injecting the alignment material in the form of a solid mixed with a bake-removable solvent through the liquid crystal injection holes 307.

Next, a liquid crystal material including the liquid crystal molecules 310 is injected to the microcavities 305 through the liquid crystal injection holes 307 by using an inkjet method or the like and relying on capillary surface tension to pull the LC material 310 in.

Then, when the liquid crystal injection hole 307 is covered by filling the liquid crystal injection hole forming region 307FP on the upper insulating layer 370, the structure illustrated in FIGS. 2 and 3 may be formed.

Figure 33:
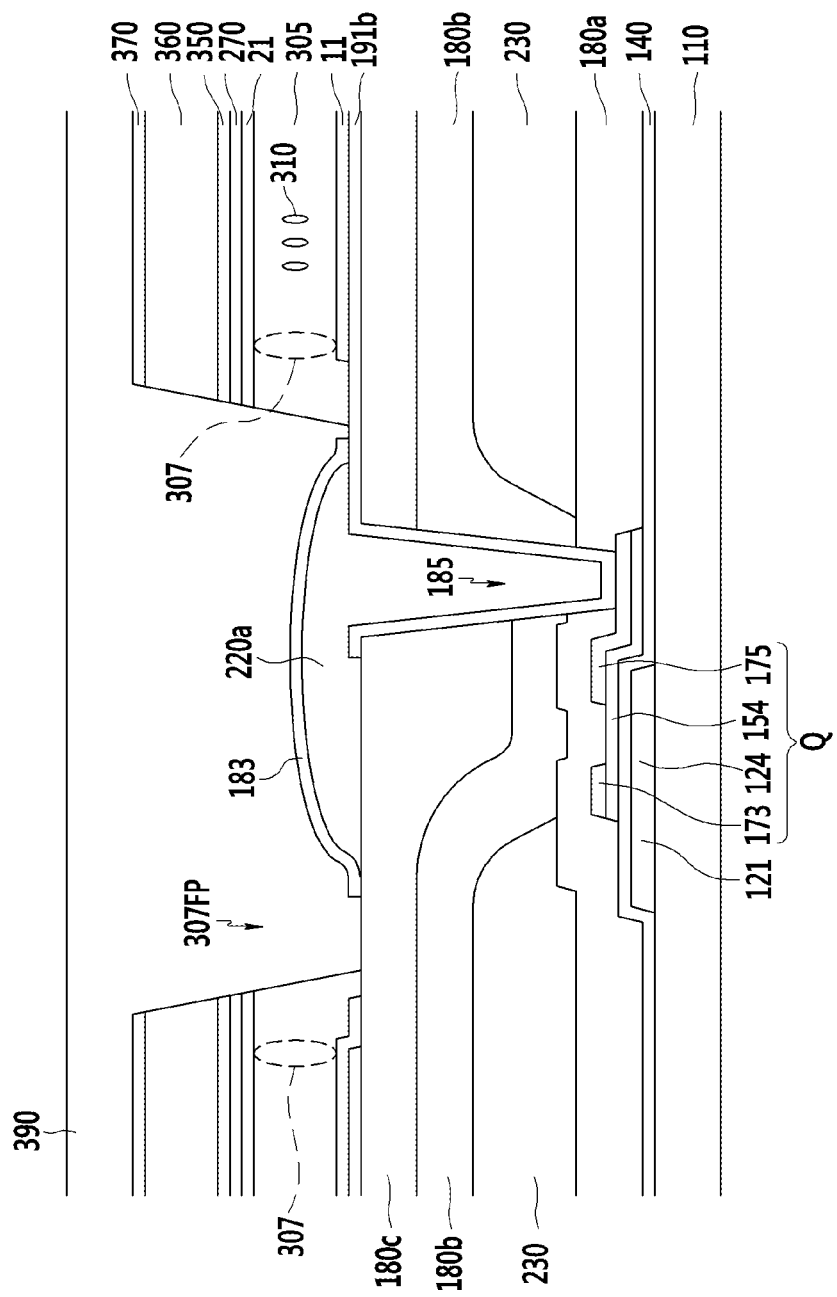
FIG. 33 is a cross-sectional view illustrating a liquid crystal display according to another exemplary embodiment.

FIG. 33 is a cross-sectional view illustrating a liquid crystal display according to another exemplary embodiment.

The exemplary embodiment to be described with reference to FIG. 33 is mostly the same as the exemplary embodiment described with reference to FIGS. 1 to 3, but is different at least in that the liquid crystal display further includes an organic layer 180c disposed between a second interlayer insulating layer 180b and a pixel electrode 180c. (Also the structure of the pixel electrode 191b is slightly different.) Accordingly, it is possible to decrease or remove a step generated in a lower layer by forming the organic layer 180c before the pixel electrode 191b is formed.

Figure 34:
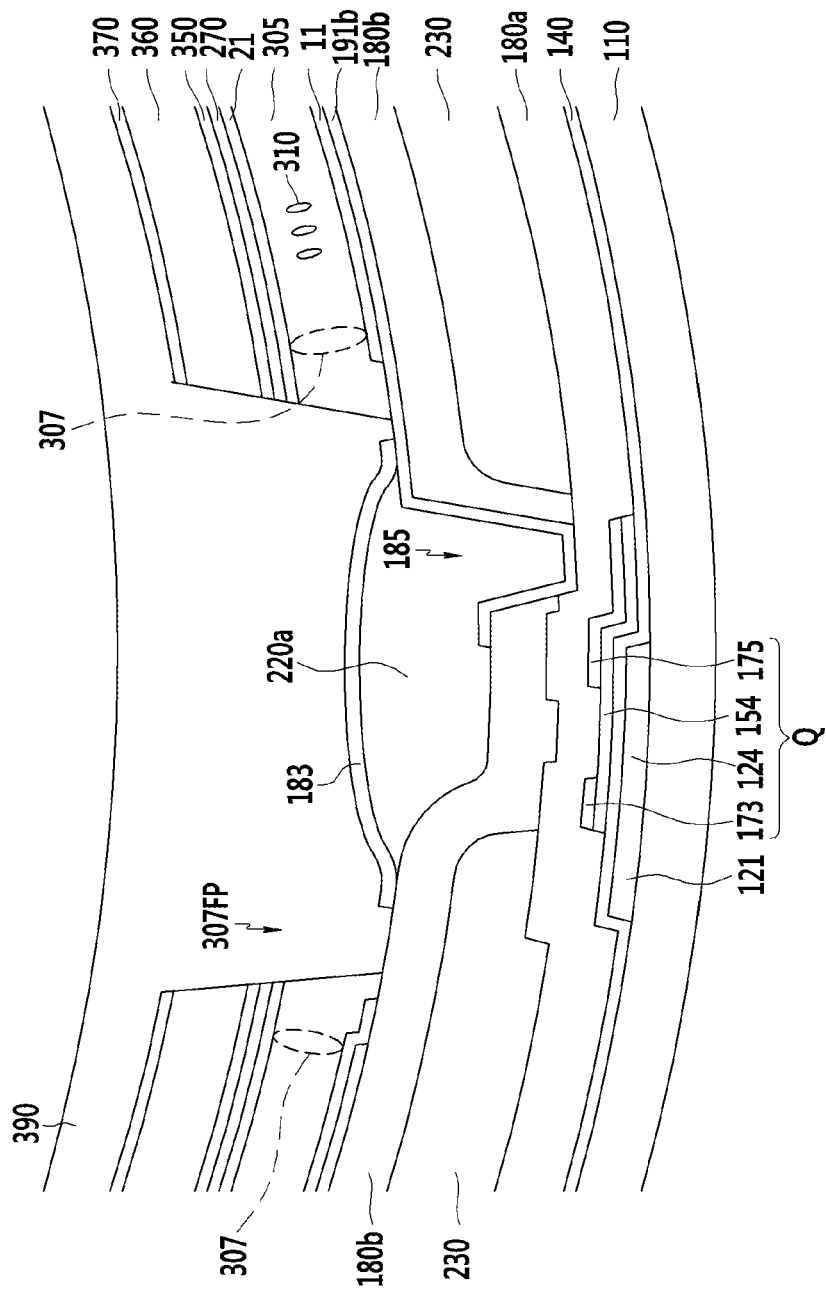
FIG. 34 is a cross-sectional view illustrating a liquid crystal display according to yet another exemplary embodiment.

FIG. 34 is a cross-sectional view according to a further exemplary embodiment.

FIG. 34 illustrates the application of the aforementioned exemplary embodiments to a flexible insulating substrate 110. Reviewing the aforementioned exemplary embodiments, for example, referring to FIG. 3 again, since the partition structure, such as the partition forming portion PWP, is formed between the microcavities 305 adjacent in the direction in which the gate line 121 is extended, stress generated is little even though the insulating substrate 110 is bent, and a degree in which a cell gap is changed may be considerably decreased. Further, even in a case where the insulating substrate 110 is not formed of a flexible material but is formed of a rigid material, such as glass, the aforementioned exemplary embodiments have the partition structure, so that a problem of the change of the cell gap or stress may be little even though the insulating substrate 110 receives power from the outside.

While this disclosure of invention has been described in connection with what are presently considered to be practical exemplary embodiments, it is to be understood that the present teachings are not limited to the disclosed embodiments, but, on the contrary, are intended to cover various modifications and equivalent arrangements included within the spirit and scope of the present teachings.

What is claimed is:

1. A liquid crystal display, comprising:
   a substrate;
   a thin film transistor disposed on the substrate;
   a pixel electrode connected with the thin film transistor;
   a roof layer disposed to face the pixel electrode;
   a liquid crystal layer disposed in a plurality of microcavities between the pixel electrode and the roof layer;
   a light blocking layer disposed between microcavities adjacent to each other of the plurality of microcavities and covering the thin film transistor,
   a passivation layer disposed between microcavities adjacent to each other of the plurality of microcavities and covering the light blocking layer,
   wherein the light blocking layer is completely covered by the passivation layer,
   wherein the passivation layer is patterned such that a width of the passivation layer is narrower than a distance between the microcavities adjacent to each other, and
   wherein the passivation layer is covered by a planarizing capping layer.

2. The liquid crystal display of claim 1, wherein: the light blocking layer is disposed on a portion of the pixel electrode.

3. The liquid crystal display of claim 2, further comprising:
   an interlayer insulating layer disposed between the thin film transistor and the pixel electrode, wherein the pixel electrode and the thin film transistor are connected by a contact hole formed through the interlayer insulating layer.

4. The liquid crystal display of claim 1, wherein: the passivation layer has a width larger than that of the light blocking layer and covers the light blocking layer.

5. The liquid crystal display of claim 1, wherein:
   the light blocking layer comprises a first light blocking layer portion extending in a row direction of the liquid crystal display and a second light blocking layer portion extending in a column direction of the liquid crystal display,
   the first light blocking layer portion overlaps a gate line and
   the second light blocking layer portion overlaps the data line.

6. The liquid crystal display of claim 5, further comprising: a storage electrode line disposed in a direction in which the data line is extended, wherein one edge of the storage electrode line is disposed more adjacently to the pixel electrode compared to one edge of the light blocking layer.

7. The liquid crystal display of claim 6, wherein: one edge of the gate line is disposed more adjacently to the pixel electrode than a corresponding one edge of the light blocking layer.

8. The liquid crystal display of claim 1, further comprising:
   an interlayer insulating layer disposed between the thin film transistor and the pixel electrode, and
   a color filter disposed between the thin film transistor and the interlayer insulating layer.

9. The liquid crystal display of claim 8, further comprising: an organic layer disposed between the color filter and the interlayer insulating layer.

10. The liquid crystal display of claim 1, wherein: the passivation layer comprises at least one of a silicon nitride and a silicon oxide.

11. The liquid crystal display of claim 1, further comprising: a common electrode disposed between the microcavities and the roof layer.

12. The liquid crystal display of claim 3, wherein:
    the light blocking layer covers the contact hole.

* * * * *